Patented Aug. 28, 1951

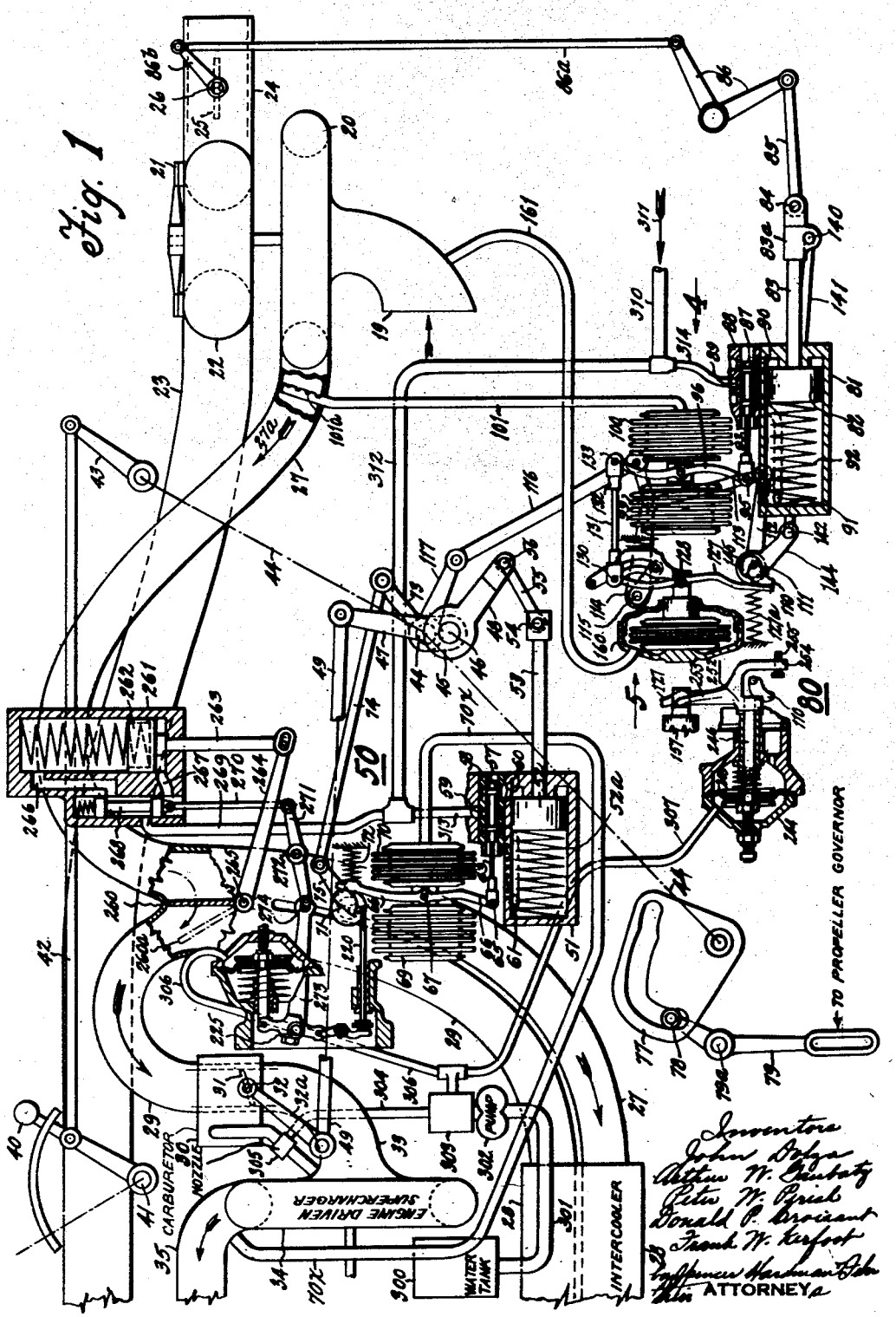

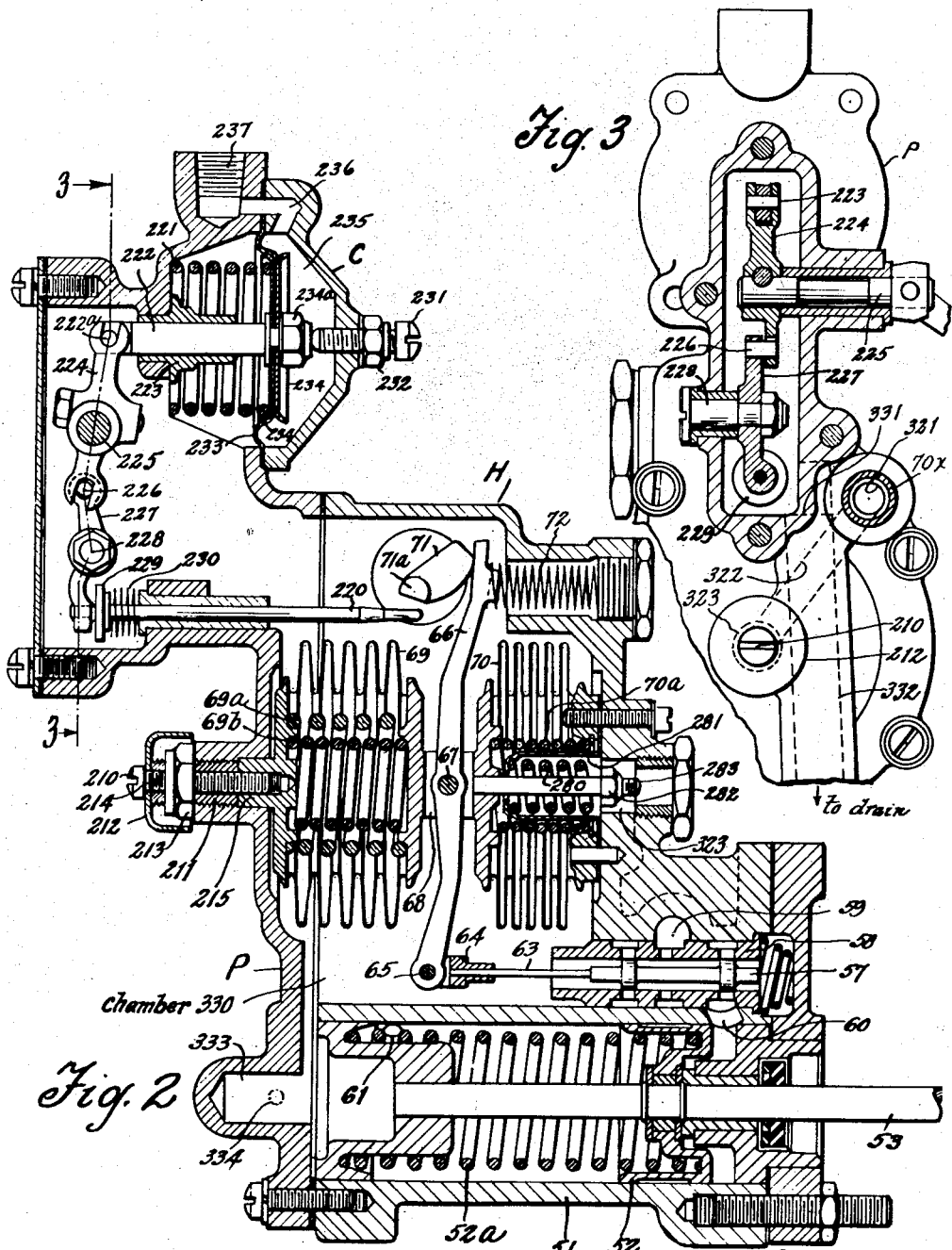

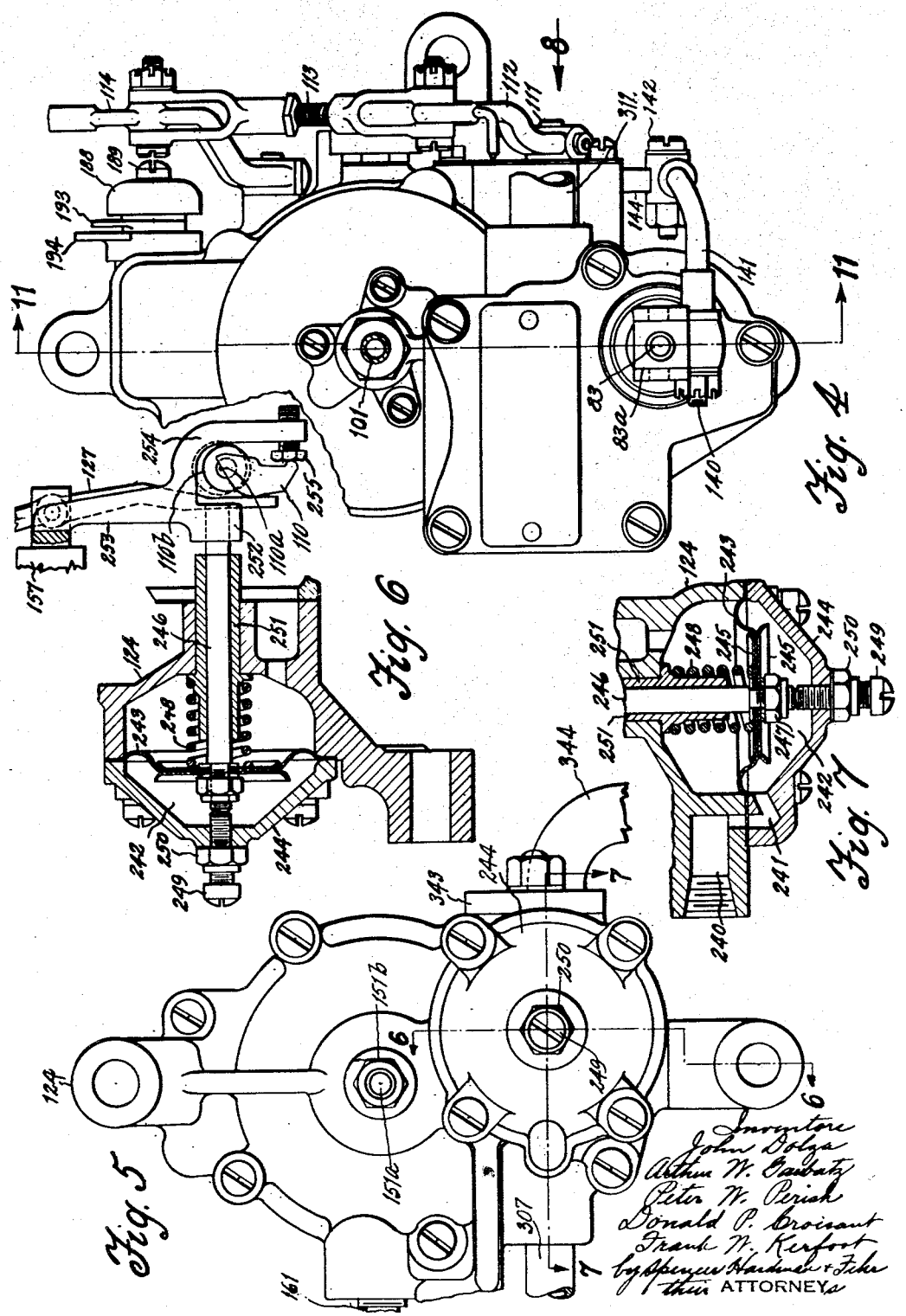

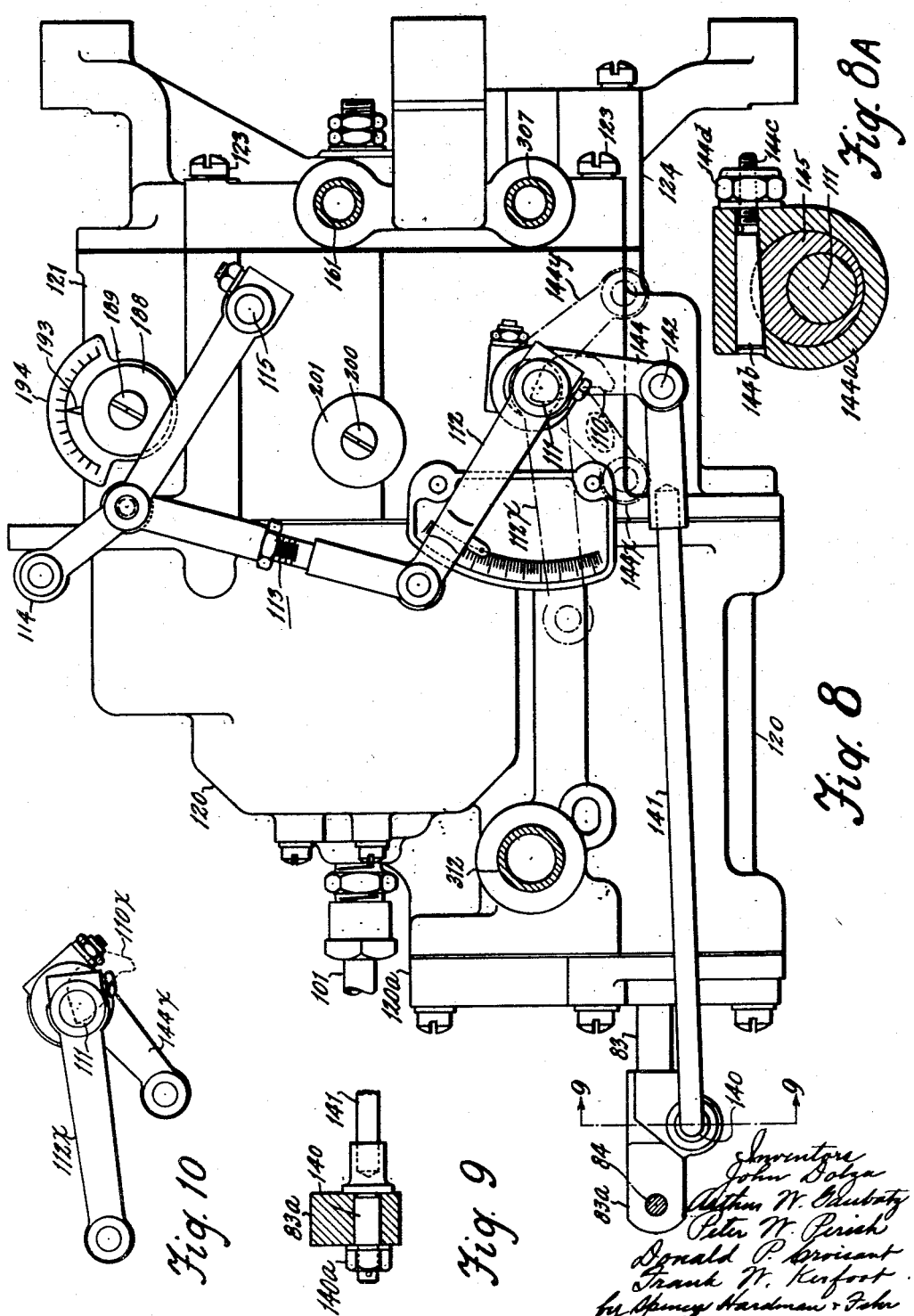

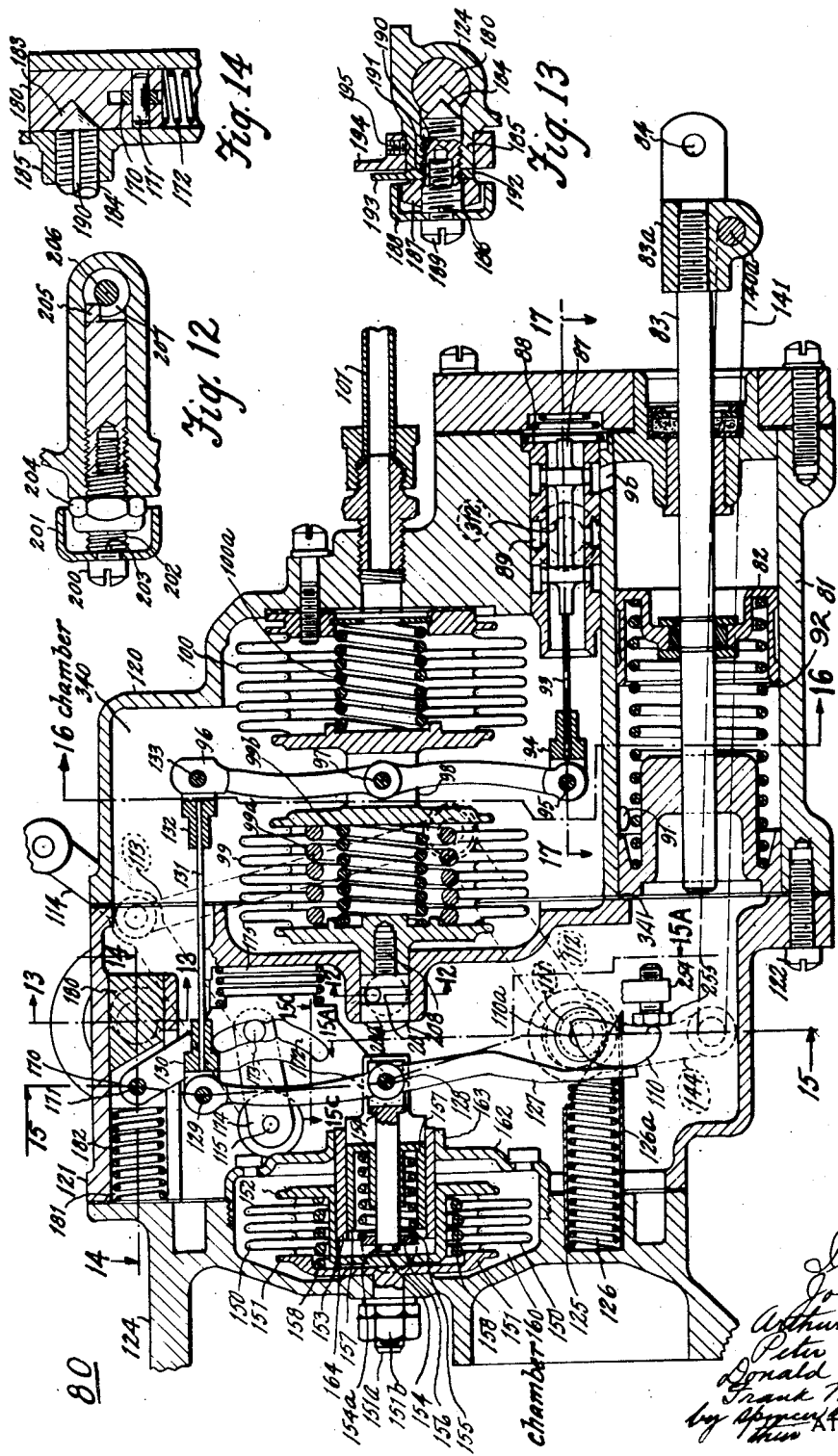

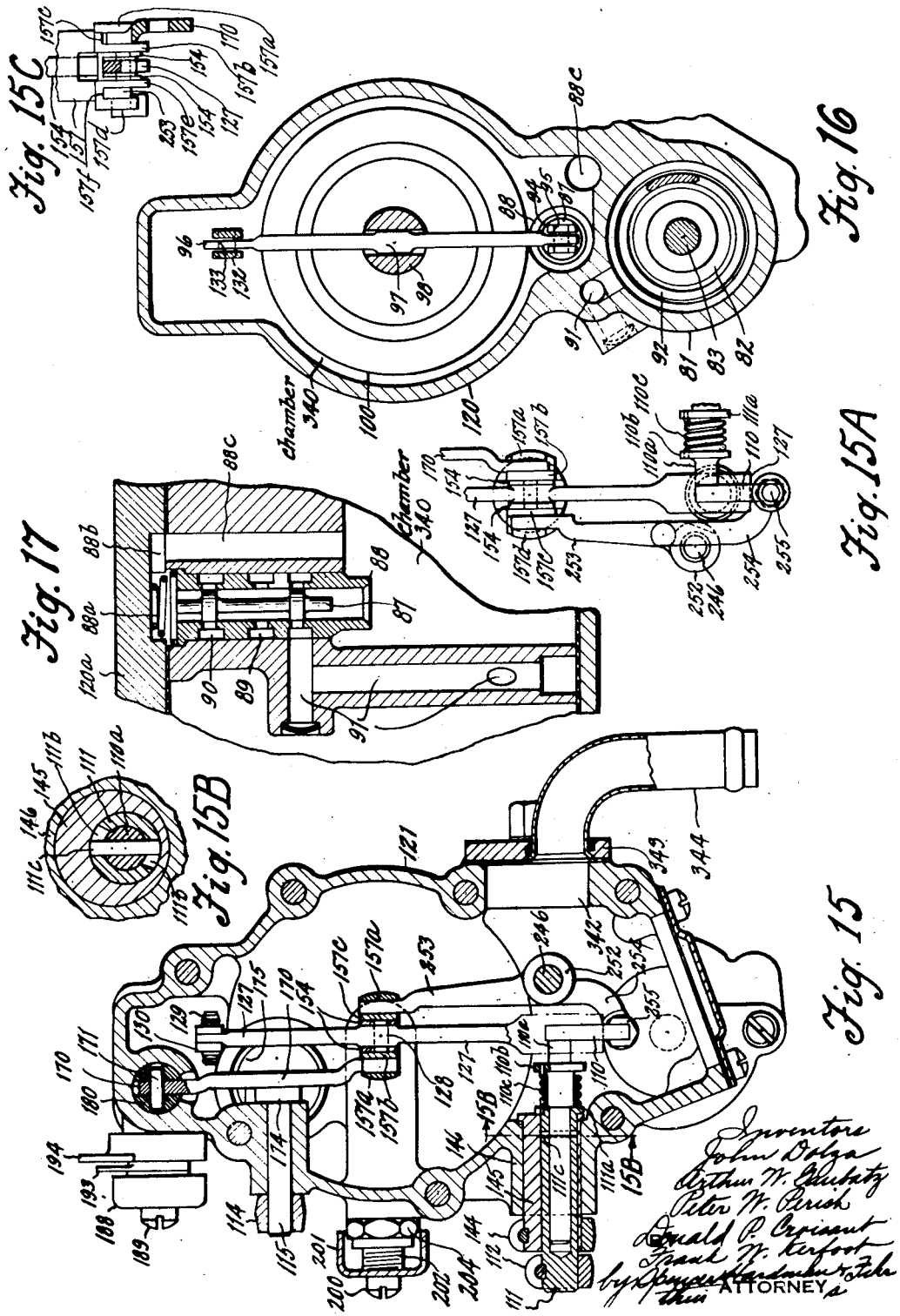

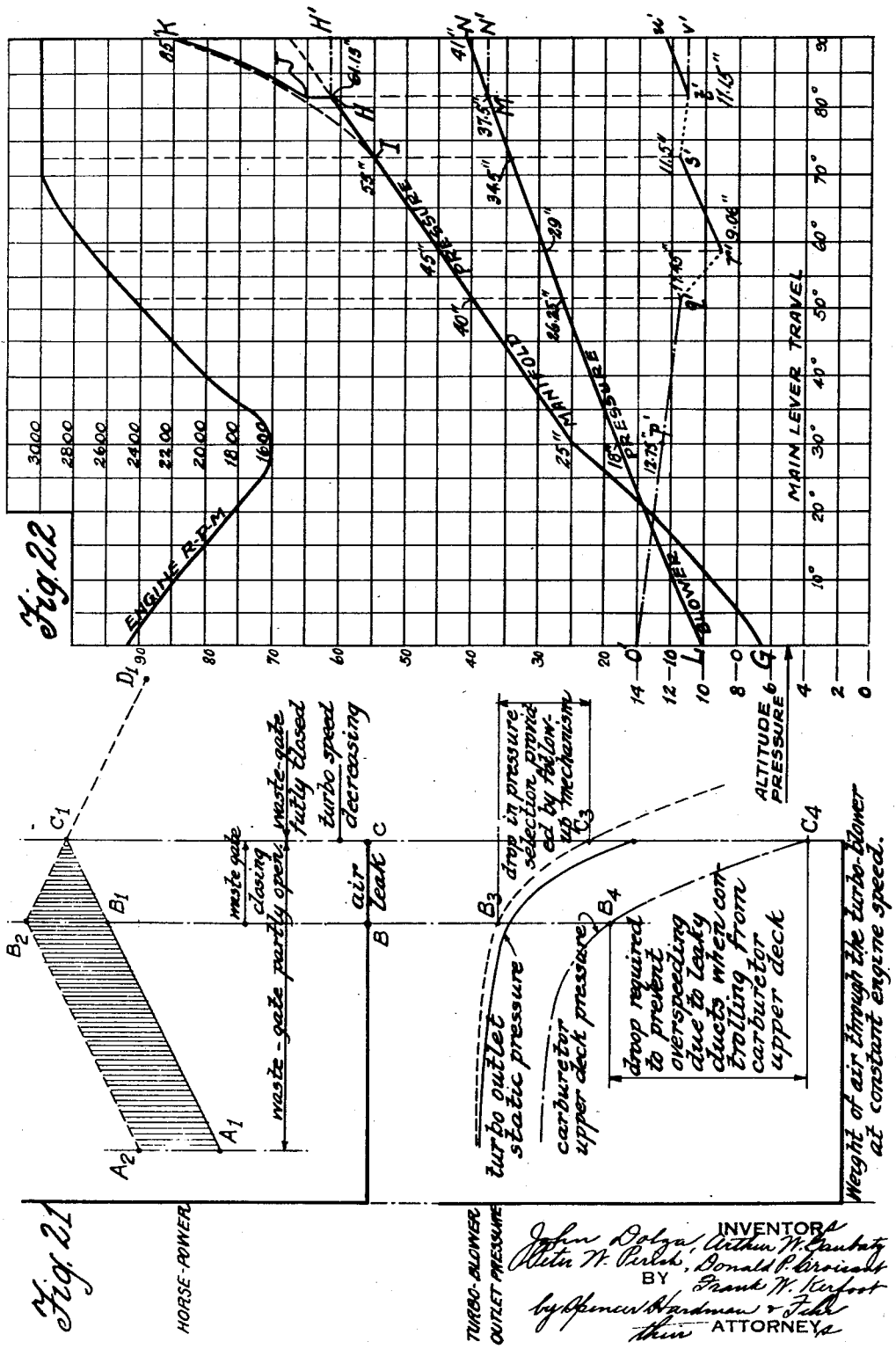

2,565,482

UNITED STATES PATENT OFFICE 2,565,482

APPARATUS FOR CONTROLLING ENGINE INTAKE PRESSURE WITH VARIABLE-SPEED BLOWER AND ENGINE THROTTLE

John Dolza, Arthur W. Gaubatz, Peter W. Perish, Donald P. Croisant, and Frank W. Kerfoot, Indianapolis, Ind., assignors to General Motors Corporation, Detroit, Mich., a corporation of Delaware Application September 7, 1944, Serial No. 553,050

40 Claims. (Cl. 60—13)

This invention relates to a supercharged airplane engine, the intake pressure of which is boosted by an engine driven supercharger and an auxiliary supercharger operated by an exhaust gas turbine.

It is an object of the invention to provide for the automatic control of the intake pressure through the use of a throttle valve regulator and a turbine speed controller coordinated therewith. The throttle valve regulator is manually conditioned by the pilot's throttle control lever to select engine speeds and engine intake pressures to be maintained according to a predetermined schedule. The throttle valve regulator has means responsive to intake pressure for controlling through a servomotor the position of the throttle valve in order to correct for divergencies from the selected pressure as the altitude changes. The turbine speed controller has a servomotor which controls the turbine waste gate and which is under control by the pilot's throttle lever, by an altitude pressure responsive device and by pressure at the outlet of the auxiliary supercharger. All of these controls are so coordinated that the auxiliary supercharger outlet pressure will conform to a predetermined relation to engine manifold pressure and engine speed in order to obtain the required engine power output at high altitude.

More particularly, the objects include provisions for stability of the control of the exhaust turbine and for operation of the control in a manner such that surge at the auxiliary supercharger is prevented, and such that the maximum safe turbo-speed is not exceeded, even when the duct between the auxiliary supercharger and the carburetor fails or is punctured in combat.

A further object is to obtain under certain special conditions intake pressures which are in excess of the maximum pressure which ordinarily can be used without engine detonation. Examples of the special conditions under which the pressure may be safely raised to a very high value are the use of alcohol-water-injection, the use of a liquid cooled intercooler or aftercooler or both, and the use of a special fuel which can be burned without detonation at high intake pressures. The present invention includes means rendered operative automatically in response to the cessation of such conditions for returning the maximum pressure to a lower value safe for engine operation without these conditions being present.

Further objects and advantages of the present invention will be apparent from the following description, reference being had to the accompanying drawings, wherein a preferred embodiment of the present invention is clearly shown.

In the drawings:

Fig. 1 is a diagram of the present invention.

Fig. 2 is a longitudinal sectional view of the throttle valve regulator shown in Fig. 1.

Fig. 3 is a sectional view on line 3—3 of Fig. 2.

Fig. 4 is an end view of the waste gate controller looking in the direction of arrow 4, Fig. 1.

Fig. 5 is an end view looking in the direction of the arrow 5 of Fig. 1.

Figure 20:
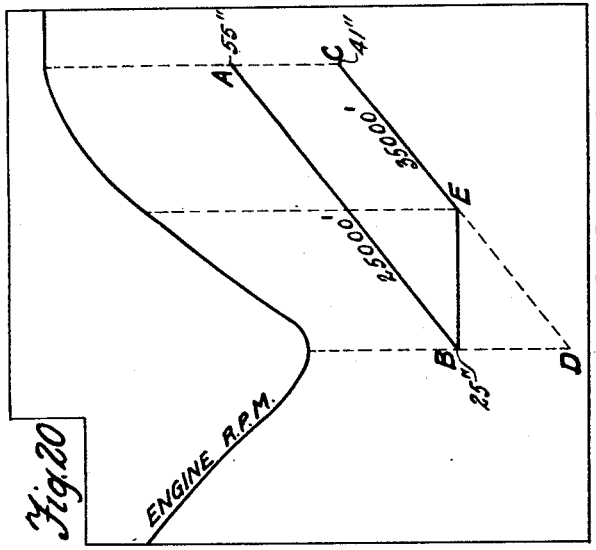

Figs. 6 and 7 are sectional views taken respectively on lines 6—6 and 7—7 of Fig. 5.

Fig. 8 is a side view of the waste gate controller looking in the direction of arrow 8 of Fig. 4.

Fig. 8A is a sectional view showing the attachment of hub 144a of lever 144 to shaft 145.

Fig. 9 is a sectional view on line 9—9 of Fig. 8.

Fig. 10 is a fragmentary view showing certain relative positions of cam 110, lever 112 and lever 144.

Fig. 11 is a sectional view on line 11—11 of Fig. 4.

Figs. 12, 13, 14, 15, 15A, 15C, 16 and 17 are sectional views taken respectively on the lines 12—12, 13—13, 14—14, 15—15, 15A—15A, 15C—15C, 16—16 and 17—17 of Fig. 11.

Fig. 15B is a sectional view on line 15B—15B of Fig. 15.

Figs. 18 through 24 are charts showing the operation of the present invention.

Referring to Fig. 1, air for the fuel mixture enters through an air-scoop 19 to an auxiliary supercharger 20 which is operated by an exhaust gas turbine 21 fed by a distributing manifold 22 connected with an engine exhaust pipe 23. The distributing manifold 22 has an outlet 24 controlled by a waste gate 25 mounted on a shaft 26. A pipe 27 conducts compressed air from the auxiliary supercharger 20 to an intercooler 28, the outlet of which is connected by pipe 29 with a carburetor 30 controlled by throttle valve 31, mounted on a shaft 32. The outlet of carburetor 30 is connected by pipe 33 with an engine driven supercharger 34 connected by manifold 35 with the intake ports of the engine.

Throttle valve 31 is manually controlled by the pilot's throttle lever 40 pivoted at 41 and connected by link 42 with a lever 43 which operates a shaft 44 indicated by dot-dash lines. Shaft 44, which is the main control lever of a throttle valve regulator 50, is connected with an arm 45 providing a pivotal support 46 for the fulcrum of a floating or differential bell-crank lever having arms 47 and 48. Arm 47 is connected by a link 49 with a lever 32a connected with throttle shaft 32. By this mechanism the throttle valve 31 is manually controlled by the pilot's lever 40. The throttle valve 31 is automatically controlled by the throttle controller 50 through an hydraulic servomotor comprising a cylinder 51 enclosing a piston 52, connected by rod 53, pin 54, link 55 and pin 56 with the differential lever arm 48. The servomotor is controlled by a valve 57 sliding in a valve guide 58. Valve 57 controls the distribution to either end of cylinder 51 of pressure fluid, which enters through an intake port 59, either to the right side of the piston 52 through a port 60 or to the left side of the piston 52 through a port 61. The normal position of piston 52 is shown in Fig. 1. It is intended that the piston shall be operated hydraulically in either direction. However, in case of failure of oil pressure, a spring 52a returns the piston 52 to its normal position.

The valve 57 is positioned by means responsive to the movement of the lever 40 and to pressure in the intake manifold 35. For this purpose, the valve 57 is connected by a flexible rod 63, a clevis 64 and a pin 65 with a lever 66 pivoted on a pin 67, supported by a bridge 68 (Fig. 2) which connects the free ends of metal bellows 69 and 70. Bellows 69 is evacuated. Bellows 70 is connected by pipe 70x to the intake manifold 35. As pressure in the intake manifold increases, bellows 70 will expand thereby causing pin 67 to move toward the left and when the intake manifold pressure decreases, the pin 67 will move toward the right. The valve 57 is positioned also by a cam 71 against which the upper end of the lever 66 is urged by a spring 72. The function of cam 71 is to select the pressure to be maintained in the manifold 35. Cam 71 is operated by the control lever 40 which, when moved counterclockwise, will cause an arm 73, connected with shaft 44, to move counterclockwise thereby causing movement of a link 74 toward the left to effect counterclockwise movement of a lever 75 connected with a shaft 76 which carries the cam 71.

The cam 71 is shown in Figs. 1 and 2 in its normal or lowest pressure selecting position. Movement of lever 40 to the left causes the cam 71 to move counterclockwise into a higher pressure selecting position, thereby causing, through the action of spring 72, a counterclockwise movement of lever 66 and a movement of valve 57 toward the right, thereby causing pressure fluid to enter through the port 60 to the right side of piston 52. Thereupon piston 52 moves left to cause clockwise movement of differential lever 47, 48 and counterclockwise movement of throttle valve 31 to cause it to open in order to increase the fuel pressure in manifold 35. When the pressure in manifold 35 equals the pressure selected by cam 71, the bellows 70 will have expanded to such an extent as to cause the valve 57 to move to a position to close both passages 60 and 61 whereupon movement of the piston 52 toward the left will cease.

As the airplane ascends, the throttle valve 31 moves gradually toward full open position in order to maintain the selected pressure. The required pressure is obtained up to critical altitude by the combined effect of the engine driven supercharger 34 and the auxiliary, exhaust-turbine-driven supercharger 20. When the engine is idling, the exhaust turbine should operate to drive the supercharger 20 at such speed as to overcome restriction to flow of air to the supercharger 34. During flight when the engine is required to operate faster and at higher manifold pressure, the auxiliary supercharger is required to operate faster in order that the combined effect of both superchargers will be such as to maintain the selected pressure. As the engine operates faster, there is more power available in the exhaust gas flowing to the turbine 21 to drive it at higher speed. In order that the auxiliary supercharger 20 will give the correct amount of boost to air flow so that the required pressure will be obtained for the power at which the engine is operating, it is necessary to so control the position of the waste gate 25 that the exhaust turbine 21 will be supplied with the correct amount of power from the exhaust gas. This control of waste gate position is effected by the waste gate controller 80 to be described. In this way the auxiliary supercharger 20 assists the engine driven supercharger 34 making available a selected pressure required for a certain engine speed.

The coordination for pressure selection and governed speed of the engine is effected by a cam 77 which is operated by shaft 44. Cam 77 cooperates with a follower roller 78 carried by a lever 79 pivoted at 79a. Lever 79 is connected with the adjusting mechanism of a propeller pitch governor not shown. Obviously movement of control lever 40 to effect a pressure selection by moving cam 71 will concurrently effect an engine governed speed selection by moving cam 77.

When the waste gate 25 is wide open as shown in Fig. 1, the exhaust turbine 21 will operate at minimum speed for a given engine; and, when the waste gate 25 is fully closed, the exhaust turbine 21 will operate at maximum speed. It has been found that satisfactory coordination of the two superchargers is obtained when the waste gate 25 is brought into a position about mid-way between fully open and fully closed positions.

The control of the waste gate 25 is effected by waste gate controller 80 which includes an hydraulic servomotor comprising a cylinder 81 and a piston 82 connected by a rod 83, a pin 84, link 85, a bell-crank lever 86, a link 86a, and a lever 86b with the shaft 26 which supports the waste gate. The admission of pressure fluid to the cylinder 81 is controlled by a valve 87 which slides in a ported guide 88. When valve 87 is moved toward the right from its position shown in Fig. 1, it will connect a fluid pressure inlet port 89 with a port 90 connected with the right end of the cylinder 81 to cause the piston 82 to move left and the waste gate 25 to move toward closed position. When the valve 87 is moved toward the left from the position shown, the fluid pressure inlet port 89 will be connected with a passage 91 leading to the left end of the cylinder 81, to cause the piston 82 to move right and the waste gate 25 to move toward open position. It is intended that the piston 82 shall be operated hydraulically in both directions; but, in case of failure of oil pressure, a spring 92 will return the piston 82 to the normal position, thereby locating the waste gate 25 in that position which effects the lowest speed of the exhaust turbine.

The valve 87 is positioned in part by a pressure selecting device coordinated with the throttle controller 50 and in part by means responsive to pressure in the pipe 27 at the outlet of the auxiliary supercharger 20. To accomplish this, the valve 87 is connected by flexible rod 93, a clevis 94 (Fig. 11), a pin 95 with a lever 96 pivoted at 97 on a bridge 98 connecting the movable ends of flexible metal bellows 99 and 100. Bellows 99 is evacuated and bellows 100 is connected with pipe 101 extending into the air passage 27 provided with a plurality of holes 101a which face in the direction of air flow as indicated by arrow 27a. It is therefore apparent that the bellows 100 is responsive to impact pressure at the outlet of supercharger 20.

This air pressure is the sum of the pressure of the air entering the scoop 19 and the pressure effected by the supercharger 20. As the pressure in bellows 100 increases, it will expand to cause the pin 97 to move toward the left, this movement being resisted by springs 99a and 99b within the bellows 99. As the pressure in bellows 100 decreases, the collapsing of bellows 100 is resisted by spring 100a within bellows 100. These springs 99a, 99b and 100a are so constructed and calibrated that the relation between variations in pressure within the bellows 100 and movements of the pin 97 is substantially a linear relation. Bellows 69 and 70 of regulator 50 contains springs 69a, 69b, 70a (Fig. 2) equivalent to those contained within the bellows 99 and 100.

It will be noted, that, with respect to the waste gate controller 80 and the throttle valve regulator 50, there is substantial similarity as to their servomotors, control valves and valve controlling bellows. In fact, many of the parts thereof may be duplicates.

In order that the position of valve 87 may be controlled in accordance with a selected pressure to be maintained, there is provided a pressure selecting cam 110 integral with a shaft 110a received by the central bore of a shaft 111 (Fig. 15) to which a lever 112 is attached. Shaft 111 has slots 111b (Fig. 15B) for receiving the ends of a pin 111c attached to shaft 110a, thereby providing a lost motion connection for a purpose to be described. A spring 110c (Fig. 15) connects the flange 110b of shaft 110a with the flange 111a of shaft 111 and urges cam 110 clockwise (Fig. 15) and cam shaft 110a counter-clockwise (Fig. 15B) so that the pin 111c is urged counterclockwise into the position shown. The cam 110 will follow shaft 111 as it is rotated for the purpose of rotating the cam 110 between the positions shown in Figs. 1 and 11. Under a certain condition, rotation of cam 110 clockwise (Fig. 11) is arrested by a screw 255, while shaft 111 may continue to rotate in a clockwise direction or counterclockwise in Fig. 15B. Cam 110 selects outlet pressures at pipe 27 which, when boosted by supercharger 34, will make available the pressures selected by cam 71 for various positions of control lever 40. The pressures selected by cam 110 are below those selected by cam 71 for flight operation. Lever 112 is connected by link 113 with a lever 114 connected with a shaft 115 which is pivotally supported by the frame 121 of the controller 80 which, as shown in Fig. 11, is attached by screws 122 to the frame 120 which provides the cylinder 81 and a housing for the bellows 99 and 100. Lever 114 is connected as shown in Fig. 1 by a link 116 with an arm 117 operated by the shaft 44.

Referring to Fig. 8, screws 123 attach the frame 121 to a mounting bracket 124 which provides a pocket 125 (Fig. 11) for receiving a spring 126 and a spring guide 126a. Spring 126 urges the lower end of a lever 127 against cam 110. Lever 127 is pivoted upon a pin 128, and its upper end is connected by a pin 129, a clevis 130, a flexible rod 131, a clevis 132 and a pin 133 with the upper end of lever 96. The pressure selecting cam 110 of the waste gate controller 80 is coordinated with the pressure selecting cam 71 of the throttle regulator 50. Both of these cams move together when the throttle control lever 40 is moved. In Fig. 1, the cam 110 is shown in its normal position corresponding to the lowest pressure selection. When a higher pressure is demanded by moving pilot's lever 40 (Fig. 1) left and through the mechanism described the cam 110 is rotated counter-clockwise for example into the position shown in Fig. 11. Before the equilibrium position of valve 87 is established as shown in Fig. 11, levers 127 and 96 are caused to move counterclockwise and valve 87 to move right, thereby placing intake port 89 in communication with port 90, thereby causing piston 82 to move left and the waste gate 25 to move toward closed position to increase the pressure in bellows 100. When the pressure in bellows 100 exceeds the pressure selected by cam 110, valve 87 moves left from the position shown in Fig. 1 to place port 89 in communication with port 91, so that the piston 82 moves right to effect movement of the waste gate 25 toward open position so that the pressure in bellows 100 decreases. The valve 87 is in the equilibrium position shown in Fig. 11 when the pressure in pipe 27 at the outlet of supercharger 20 equals the pressure selected by cam 110. When this occurs, the waste gate 25 is about mid-way between wide open and fully closed positions, piston 82 (Fig. 11) being in mid position. The cam 110 effects a control of the waste gate 25 jointly with the bellows 100 (responsive to auxiliary supercharger outlet pressure) and with bellows 150 (responsive to impact pressure) such that auxiliary supercharger outlet pressure bears a predetermined relation to the pressure maintained by the throttle regulator 50.

To prevent surging, or hunting, the controller 80 is provided with a follow-up mechanism. Referring to Figs. 1, 8 and 11, the connector 83a, attached to the outer end of piston rod 83 for carrying the pin 84, receives a pivoting portion 140 of a rod 141 connected by pin 142 with a lever 144. Portion 140 is retained in connector 83a by a screw 140a (Fig. 9). The hub 144a (Fig. 8A) of lever 144 is attached to a shaft 145 by a taper pin 144b which is wedged against the shaft by tightening a nut 144d on the threaded end 144c of the pin. (Lever 112 is attached to shaft 111 in a similar manner.) Shaft 145 (Fig. 15), which is journalled in a bearing 146 of housing 120, eccentrically supports the shaft 111 of cam 110. When piston 82 moves left, the follow-up mechanism causes the axis of shaft 111 to move clockwise (Fig. 11). This has the effect of decreasing the pressure selection just as though the cam 110 had been rotated clockwise. During the complete movement of the piston 82 from right to left to close the waste gate, the pressure selection which had been for example in the neighborhood of 30″ Hg, absolute, would be reduced about 4″ Hg. The reduction of selected pressure by the follow-up mechanism is called "droop."

It has been observed that, for the particular installation for which the disclosed turbo-control was developed, that the waste gate 25 stabilizes to approximately half-open position as selected pressure is obtained. During a demand for higher pressure, piston 82 moves left and the waste gate closes entirely. Simultaneously, the selected pressure from the cam 110 will be approximately 2″ Hg less than at waste gate stable position. This droop of 2″ Hg effects the start of the cycle of moving the waste gate toward its stabilized position before the actual pressure at the supercharger outlet is reached. Therefore the tendency to over-boost the pressure is counteracted by a concurrent movement of the waste gate 25 toward stable position. The opposite action occurs when a lower pressure is selected.

The portion of droop between half-open and fully closed positions is used also to prevent overspeeding of the turbine 21 when the ducts between the supercharger 20 and the engine (supercharger 34) are punctured or severed. For that purpose the droop may be increased somewhat above the minimum required for stability only.

It is apparent from the foregoing that the follow-up mechanism provides stability of operation of the controller 80, and prevents overspeeding of the turbine 21 caused by duct failure or air leaks since the regulator 80 is responsive to total pressure at the outlet of the turbo-supercharger 20.

During ascent of the airplane, the turbine 21 becomes stable at a speed capable of producing the pressure which was selected at low altitude for the climb to a higher altitude. As the airplane ascends with the same selected outlet pressure in pipe 27, the turbine speed increases. During this increase, the following conditions will occur if no means are provided to prevent it: (1) for a moderate pressure selection in pipe 27, surge will develop in the air duct; (2) for a high pressure selection in pipe 27, the speed at which the turbine can safely operate will be exceeded. The controller 80 provides means for avoiding these conditions by an altitude responsive means for modifying the pressure selected by cam 110.

The altitude responsive means for modifying the pressure selection set by cam 110 comprises an aneroid bellows 150 (Fig. 11) sealed between plates 151 and 152 and evacuated. Plate 151 is attached to bracket 124 by an integral stud 151a and nuts 151b. Plate 152 is cupped to provide a wall 153 which is engaged by a rod 154 urged against the wall 153 by a spring 155 confined by a washer 156 (fixed to rod 154 by a snap ring 154a) and an abutment member 157 which, for the present may be considered fixed. Rod 154 is guided by the member 157 and supports the pin 128. A spring 158 is located between plates 151 and 152 to oppose movement of plate wall 153 toward plate 151 when atmospheric pressure is increasing and to urge plate 152 away from plate 151 when atmospheric pressure is decreasing. For proper response of the aneroid bellows 150 to pressure altitude available at the intake of supercharger 20, it is located in a chamber 160 connected by a pipe 161 (Fig. 1) with the scoop 19. The chamber 160 is provided by a recess in bracket 124 closed by a plate 162 having a flange threaded into the recess wall as shown in Fig. 11. Plate 162 has a central opening surrounded by a flange 163 attached to a tube 164 along which the cupped-portion of bellows plate 152 may slide. As pressure altitude in chamber 160 decreases, spring 158 expands and its expansion is resisted by spring 155. Springs 155 and 158 are so related that when the required speed of the turbine is reached, the pin 128 will move right to effect a control of the waste gate operating servomotor to prevent excess speed.

Figure 18:
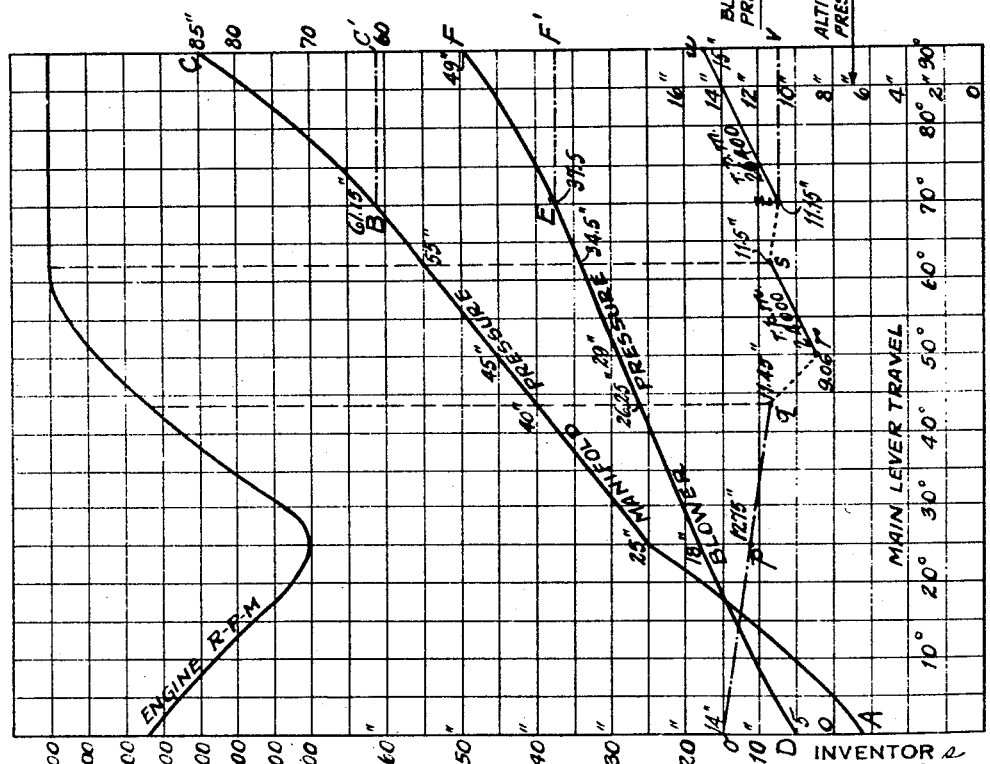

Fig. 18 shows a schedule of relations between engine governed speed and manifold pressure and auxiliary blower pressure to meet the operating requirements of a certain engine. Curve A—B—C is the manifold pressure curve for various positions of the main control lever 40 of controller 50 (Fig. 1) when water injection is used; and A—B—C' is the manifold pressure curve without water injection. To make this pressure available in the manifold, the outlet pressures of the supercharger 20 are those represented by curve D—E—F when water injection is used, and by curve D—E—F' without water injection. In order to obtain the required blower outlet pressures at various altitudes, the spring 155 (Fig. 11) which controls the aneroid 150 must be variably stressed according to line $o$—$p$—$q$—$r$—$s$—$t$—$u$ (with water injection) or —$v$ (without water injection), in Fig. 18. This line shows, for various positions of main lever 43, the altitude pressures (scale at the lower right of Fig. 18) at which the aneroid 150 should begin to exercise control over waste gate controller 80. More specifically, this line shows the various altitude pressures which, when added to the pressure of spring 155, gives a summation of forces balancing the spring 158. Fig. 18 shows that when a manifold pressure of 25" Hg has been selected by movement of lever 40 to the 25° position, the pressure at the outlet of blower 20 should be 18" Hg. In order that this pressure will not be exceeded as the altitude increases, the aneroid should begin to move the pin 128 (Fig. 11) toward the right at altitude pressure 12.75" Hg. For pressure selection 40" Hg, the blower outlet pressure should be 26.25" Hg and altitude pressure at which pin 128 is moved right from normal by the aneroid 150 is 11.45" Hg. When the pressure selection is 45" Hg, the blower outlet pressure should be 29" Hg and the altitude pressure at which pin 128 moves right from normal is 9.06" Hg. Line $q$—$r$ denotes a transition from line $o$—$p$—$q$ to point $r$ corresponding to which the turbine 21 should begin to operate at rated maximum speed, meaning the speed at which it may safely operate for a long period. In order to limit the turbine speed to the rated maximum (24,000 R. P. M. for example) it is necessary that the autitude pressure, at which pin 128 begins to move right from normal, be increased from 0.06" Hg to 11.5" Hg as the pressure selection is raised from 45" Hg to 55" Hg. While the turbo-blower speed remains constant between the 45" and the 55" pressure selection, the blower outlet pressure increases because more air is passing through the blower due to wider opening of the throttle and because there is more turbine power available to move the air since exhaust gas pressure is increasing with engine power output which increases with increase of intake pressure and with increase of speed.

The 55" pressure selection is for "take-off" and higher pressures are for "emergency." Emergency pressures may reach 61.15" without water injection as represented by line B—C' and turbo blower outlet pressure may reach 37.5 as represented by line E—F'. With water injection, the manifold pressure may reach 85" (Point C) and the turbo blower outlet pressure may reach 49" (Point F). In passing from 55" to 61.15" pressure selection the turbo outlet pressure passes from 34.5" to 37.5" and the pressure altitude at which pin 128 starts to move right from normal changes from 11.5" to 11.15" Hg. The result of this change of control by the aneroid 150 is to increase the speed of the turbine from the rated maximum 24,000 R. P. M. to 26,400 R. P. M. which is considered safe for emergency operation for relatively short periods. When water injection is used, the control of the aneroid spring 155 is that represented by line $t$—$u$ extruding from 11.15" to 15" altitude pressure. When water injection is not used a mechanical stop (not shown)

limits movement of the lever 40 to such position that lever 43 cannot move past the 70° position. When water injection is used, the stop is retracted and the emergency manifold pressure can have values on line B—C, while the turbo blower outlet pressure attains corresponding values on the line E—F. When the supply of water ceases, means are provided for automatically reducing the manifold pressure from a value on line B—C to the maximum represented by line B—C' and the turbo blower outlet pressure from a value on line E—F to the maximum represented by line E—F'. These means include devices to be described later for automatically pushing lever 66 away from cam 71 of regulator 50 and for automatically pushing the cam 110 of controller 80 to a position of lower pressure selection and for automatically maintaining the spring 155 under the same compression that it must have in order to meet the condition denoted by point $t$ (11.15") in Fig. 18. The effect on the controller 80 is the same as though line $t$—$u$ were moved into coincidence with line $t$—$v$.

In order to meet the conditions denoted by line $o$—$p$—$q$—$r$—$s$—$t$—$u$, there is provided a lever 170 pivoted on a pin 171 and providing a cam slot 172 having a configuration for effecting the control represented by this line. Slot 172 receives a pin 173 on a lever 174 attached to shaft 115 which is operated by lever 114, which is operated by main control lever 40. Therefore the movements of lever 170 are coordinated with pressure selection. Lever 170 is urged left by a spring 175 which maintains the right edge of the slot 172 against the pin 173. Lever 170 engages member 157 which as shown in Fig. 15C has a notch between two flanges 157a and 157b between which the lever 170 is located, the notch defining surface 157c being engaged by the lever 170. As lever 40 is moved to select various pressures, the lever 170 is moved into various positions by pin 173 in order to variably stress the spring 155 in order to obtain the control represented by line $o$—$p$—$q$—$r$—$s$—$t$—$u$.

The pivot pin 171 is adjustable laterally by moving a block 180 on which it is mounted. The block 180 slides in a recess 181 provided by housing 121 and closed by bracket 124; and a spring 182 urges the block right in Fig. 11 or up in Fig. 14 to cause one side of its tapered hole 183 to engage the tapered end of a screw 184 which is threaded into a boss 185 of housing 121. The screw 184 is turned by a screw driver applied to notches 186 (one shown in Fig. 13) in the left end of the screw in order to move the block 180 endwise; and the screw 184 is locked in adjusted position by a self-locking nut 187 which becomes accessible upon removal of a guard 188 attached to screw 184 by a screw 189. The screw 184 has a slot 190 for receiving a key 191 integral with a washer 192 having a pointer 193 moving past graduations on a dial 194 (Fig. 8), the hub of which can be secured by a screw 195 to the boss 185 in the desired location. An adjustment of screw 184 is made to obtain the effect represented by a normal requirement such as denoted by the line $o$—$p$—$q$—$r$—$s$—$t$—$u$ and the screw 184 is locked by the nut 187. The dial 194 is moved so that its zero mark is adjacent the pointer 193 and the dial is fixed to boss 185 by tightening the screw 195. The dial graduations will thereafter be used to indicate the extent of modification of the normal setting of the lever 170 when the screw 184 is thereafter turned in either direction to effect such modification. The modification which can be effected by turning the screw 184 in either direction is that which would be denoted by rotating the line $o$—$p$—$q$—$r$—$s$—$t$—$u$ as a whole about the point —$o$— in either direction. If this line is raised the manifold pressure would be raised, and vice versa. Obviously this line should be as high as possible while avoiding detonation.

An initial adjustment of the bellows 99 and 100 and pin 97 (Fig. 11) may be required. To do this, a screw 200 (Fig. 12) threaded into a screw 202 is removed to obtain removal of a guard 201. A self-locking nut 204 is loosened to permit turning the screw 202 by applying a screw driver to its slots 203 (one shown in Fig. 12). When screw 202 is turned an eccentric pin 205 turns to push on a screw head 206 having a slot 207 which receives the pin 205. Head 206 has a threaded shank 208 screwed into the left end plate of bellows 99. In this way the turning of screw 202 effects a longitudinal adjustment of the bellows 99 and 100 and a lateral adjustment of the pin 97.

A similar adjustment for bellows 69 and 70 and pin 67 of throttle regulator 50 is provided as shown in Fig. 2. To make this adjustment a screw 210, passing through a screw 211 (threaded into the cover plate P of housing H), is removed to obtain removal of a guard 212, so that a self-locking nut 213 may be loosened. Screw 211 is turned by applying a screw driver to its notches 214 (one shown in Fig. 2). As the screw 211 is turned the central boss 215 bears against the right end of the screw under the action of the bellows springs, and the bellows are longitudinally adjusted and the pin 67 is laterally adjusted.

The cam 71 is so designed as to effect the selection of pressures up to 85" Hg. It is operative to perform the function indicated by line B—C (Fig. 18) when water injection is being used, otherwise its function is limited to selection of pressures up to 61.15" as denoted by line B—C'. The control of the function of cam 71 in response to pressure or absence of water injection is effected by fluid pressure responsive means for controlling the position of a stop rod 220 which normally is maintained in the position for limiting pressure selection to 61.15" (or whatever is safe for engine operation without water injection) by a spring 221 acting through a rod 222 guided by a bushing 223, a pin 222a carried by the rod 222, a lever 224 fixed to a shaft 225 and having an upper forked end receiving the pin 222a, a pin 226 received by the lower forked end of the lever 224, and carried by a lever 227 pivoted at 228 and having an arm bearing against a disc 229 fixed to the rod 220, and urged by a spring 230 against the lever 227. Movement of the rod 222 to the right under the action of spring 221 is limited by a stop screw 231 threaded through a diaphragm cover C and retained by a self-locking nut 232. Cover C and a diaphragm 233 (located between discs 234 attached by self-locking nut 234a to the threaded right end of rod 222) define a pressure fluid receiving chamber 235 connected by a passage 236 with a pipe-tapped opening 237 for the attachment of a pipe 306 (Fig. 1) connected with the water injection system to be described by a device which causes chamber 235 to be connected with the water pressure source so long as water flows out the injection nozzle. When the water flows out of the injection nozzle, water pressure builds up in the chamber 235 and spring 221 is overcome and the diaphragm 233 moves left and the rod 220 moves left away from the lever 66 so that it may follow the cam 71 into the surface portions thereof nearest the cam axis whereby high pressures are selected when required. When water injection ceases, fluid pressure in chamber 235 falls and spring 221 becomes operative to return the rod 220 into the path of movement of the lever 66 to prevent it from following the cam 71 when in certain positions of high pressure selection.

The waste gate controller 80 has a similar device. A pipe 307 (Fig. 1) conducts a pressure fluid to a tapped opening 240 (Fig. 7) in bracket 124, said opening being connected by passage 241 with a chamber 242 defined by diaphragm 243 and a cover 244. Diaphragm 243 is confined between plates 245 attached to a rod 246 by a self-locking nut 247 threaded on the rod. The rod 246 is urged left (Fig. 6) and down (Fig. 7) by a spring 248; and this movement is limited by the engagement of the rod 246 with a stop screw 249 threaded through the cover 244 and retained by a self-locking nut 250. Rod 246 slides in a bushing 251 supported by the bracket 124 and is attached to a member 252 providing a stop arm 253 for engaging the member 157 (Figs. 15, 15A, 15C) which confines the spring 155. As shown in Fig. 15C arm 253 is received between flanges 157d and 157e of part 157 and will bear against the surface 157f, when there is no water injection and when the pressure selection is 61.15" and the turbo blower outlet pressure is 37.5". The member 252 has an arm 254 (Fig. 6) which carries a screw 255. When there is no water injection, screw 255 blocks movement of cam 110 beyond the position for 37½" turbo blower outlet pressure (Fig. 18). At the same time, the arm 253 keeps the spring 155 under that state of compression required for 11.15" altitude pressures as indicated by line $t-v$ so that turbine speed will not exceed 26,400 r. p. m. When the main control lever 40 of controller 50 is moved further than the 70° position in anticipation of the use of water injection, spring 110c (Fig. 15) is additionally twisted while shaft 111 moves counterclockwise (Fig. 15B) relative to pin 111c. The droop control, effected by movement of piston 82, rod 83, link 141, lever 144 and shaft 145, remains effective because cam 110 and lever 127 are always engaged.

When water injection is operating, pressure fluid acts concurrently against diaphragm 233 (Fig. 2) of regulator 50 and diaphragm 243 (Fig. 6) of controller 80 whereupon rod 220 moves out of the path of movement of lever 66 (Fig. 2) to permit it to follow cam 71 in its pressure selecting position exceeding 61.15" and whereupon screw 255 moves to the right of cam 110 to allow it to move (under action of spring 110c (Fig. 15)) into pressure selecting positions exceeding 37.5", and whereupon arm 253 moves out of the path of movement of member 157 to allow spring 155 to move member 157 against the lever 170. Then the control functions according to lines B—C, E—F and $t-u$ of Fig. 18.

Concurrently with the movement of diaphragm 233 under fluid pressure, a valve 260 (Fig. 1) which is normally closed is moved to 260a to open a by-pass between pipes 27 and 29 so that the intercooler is by-passed. For this purpose, the valve 260 (Fig. 1) is operated by a servo motor having a cylinder 261 receiving a piston 262 attached to a rod 263 connected with a lever 264 attached to a shaft 265 carrying the valve 260. The cylinder receives pressure fluid through passages 266 or 267 controlled by a valve 268 which controls the admission of pressure fluid entering a pipe 269. Valve 268 is connected by link 270, lever 271 (pivoted at 272) with lever 273 (through a pin 274) attached to shaft 225. These parts are so constructed and arranged that movement of diaphragm 233 to the left (under fluid pressure) causes valve 268 to move down so that the lower end of cylinder 261 receives pressure fluid while the upper end discharges and piston 262 moves up and valve 260 moves to 260a. When the intercooler by-pass is used a certain loss of pressure in the intercooler is avoided and turbo blower outlet pressure need not be carried to 49" to obtain 85" manifold pressure. If, for example, the loss in the intercooler is 8", the maximum turbo-blower outlet pressure will be 41" as indicated at N in Fig. 22. When the system includes the intercooler by-pass, the control cams are shaped so as to obtain the control shown in Fig. 22, in which G—I—K is the manifold pressure line, L—M—N is the blower outlet pressure line and line $o'-p'-q'-r'-s'-t'-u'$ represents the control by cam 172 when water injection is operating. Without water injection the system will function according to I—H—H', M—N' and $t-v'$ when the cam 71 is located for the selection of pressures exceeding 61.15".

The B—C portion of the manifold pressure line (Fig. 18) is greater in slope than the connecting lower portion of this line. To obtain this effect, a spring 280 (Fig. 2) is placed in bellows 70 of regulator 50. Spring 280 is located in a fixed cup 281 and is engaged by a self-locking nut 282 on a rod 283 fixed to the left end plate of bellows 70. The nut 282 does not compress spring 280 until the pressure selection exceeds 61.15" whereupon the characteristic of the spring combination so changes as to produce the effect denoted by B—C (Fig. 18).

When the system is provided with the intercooler by-pass, the nut 282 is so adjusted as to begin to compress the spring 283 at the 55" pressure selecting position of lever 43 (at its 72.5° position, Fig. 22). Therefore the increase in slope of the manifold pressure line begins at I. Manifold pressures follow I—K when water injection is operating and the intercooler by-pass is opened. When water injection ceases and the intercooler by-pass closes concurrently therewith, the actual manifold pressure immediately falls from J—K to H—H' when the lever 43 is above the 61.15" pressure selecting position, and the actual manifold pressure immediately falls from I—J to I—H when the lever 43 is in a pressure selecting position between 55" and 61.15".

In Fig. 1 there is a diagram of the water injection system. The water or water-alcohol mixture is contained in a tank 300 connected by a pipe 301 with a motor driven pump 302 which forces the water through a metering device 303 and a pipe 304 to a nozzle 305 through which liquid fuel flows from the carburetor 30. So long as the water flows out the nozzle 305 at the required rate, water under pressure will be conducted by the pipes 306 and 307 to the diaphragm chambers of regulator 50 and controller 80. When water ceases to flow at the required rate from the nozzle 305, the diaphragm chambers are not supplied with water under pressure to overcome the springs which oppose movement of the diaphragm and effect, through the stop members, the limitation of manifold pressures to a value safe for engine operation without water injection. A water injection system with which the apparatus of the present application can be used is described and claimed in the patent to Dolza, et al., No. 2,491,484, granted December 20, 1949.

When cruising at 45" pressure selection, for example, as in formation flight, the selected pressure obtained by the turbo control cam 110 exceeds the pressure required to produce the pressure selected by the throttle regulator cam 71 by an amount called positive overlap. This overlap provides immediate response to throttle opening and the acceleration necessary when changing from formation flight to military. If overlap in summer is 2", for example, it will be 4" in winter on account of the difference in air density. For military power at 55" pressure selection, for example, the positive overlap is zero in summer and 2½" in winter. In the emergency pressure range, such as 61.5" pressure selection, the overlap should be negative in order to obtain approximate borderline detonation control of pressure. Negative overlap means that the selected pressure obtained by cam 110 is less than the pressure required to produce the pressure selected by cam 71.

Surge is caused by the blower running too fast for the amount of air pulled through it. For example, when descending on gentle glide from a high altitude, the turboblower may get into the surge range if the turbine speed is in excess of the amount of air being pulled through it by operation of the engine driven supercharger. To get out of the surge range, it is necessary to boost the air flow or reduce the turboblower speed.

Figure 19:
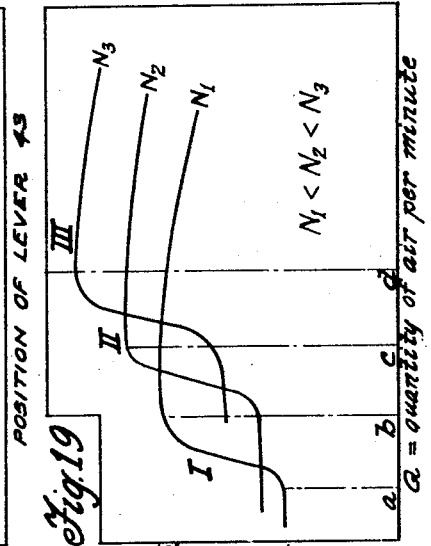

Fig. 19 shows the relation of turboblower outlet pressure (b.o.p.) and Q which is the quantity of air delivered from turboblower. The abscissa, left to right, shows increasing Q. The ordinate shows corresponding values of b.o.p. Assuming a constant altitude, Curve I is for the blower speed $N_1$ less than $N_2$ and less than $N_3$; Curve II is for blower speed $N_2$ greater than $N_1$ and less than $N_3$; and Curve III is for blower speed $N_3$ greater than $N_2$ and $N_1$.

The steep part of each curve is the surge range. $N_1$ being a constant for curve I, as Q increases from zero, b.o.p. increases according to curve I, rapidly from $a$ to $b$, (surge range), and decreases gradually through the stable range $b$ to $x$. For a higher speed $N_2$, Q must be raised to such value that Q equals $c$ before the stable range is reached. For a still higher speed, $N_3$, Q must be raised to such value that Q equals $c$ before the stable range is reached.

Therefore it is apparent that avoidance of the surge range is avoided by increasing Q or by reducing N.

Fig. 18 shows that, when altitude pressure is 11.45" (q), the aneroid has so controlled the b.o.p. selection as to give 26.25" b.o.p. when the main control member has been moved to select 40" and engine speed 2430 R. P. M. Surge is avoided because the engine driven supercharger is driven at such speed coordinated with engine speed 2430 R. P. M. as to cause such air flow from the turboblower that Q/N is in the stable range. Point $q$ on Fig. 18 denotes that, when altitude corresponding to 11.45" pressure is reached, the turbine is operating at maximum safe speed in order to give 26.25" b.o.p. which combined with the engine blower gives 40" manifold pressure. If the pilot selects a lower manifold pressure at altitude pressure 11.45", he may find that the pressure actually existing in intake will be so much less than the selected pressure that he will not be able to cruise and he must move the control lever to a higher pressure selecting position in order to maintain minimum cruise pressure in the intake. By such movement of the control lever, the engine speed is raised with the result that Q/N is raised to value in the stable operating range of the turboblower.

For selections up to 40" manifold pressure, the aneroid expands with increasing altitude against the spring 155 in order to keep the turbine speed within the limit of 24,000 R. P. M. For higher pressure selections, the compression of spring 155 is modified by shifting lever 170 according to $r$—$s$—$t$—$u$. ($t$—$u$ provided water injection is used, otherwise $t$—$v$). The higher pressure selections do not run into surge; but the lower pressure selections may run into that condition. Avoidance of surge is obtained by the aneroid control of turbospeed in the manner represented by line $o$—$p$—$q$ (Fig. 18).

Line A—B of Fig. 20 represents cruising at 25,000 feet using pressure selections 55" down to 25". According to Fig. 18, the turbo blower operates at maximum rated speed at 55" pressure selections (control on line $r$—$s$). From 40" to 25" pressure selection, the aneroid obeys lines $o$—$p$—$q$ so that turbospeed does not exceed the maximum. As the pressure selection is reduced, exhaust pressure decreases, and turbospeed decreases. Therefore Q and N (of Q/N) are reduced in about the same proportion so that the Q/N value as related to b.o.p. value is not in the surge range of the curve of Q related to b.o.p.

For example, at 25,000' altitude the selected pressure can be reduced to 25" for minimum cruise without running into Q/N surge. At 35,000' altitude, when 55" is called for, only 41" can be obtained, because the turbospeed is limited. Therefore C on line C—E—D representing cruising at 35,000 ft. is lower than A. As the pressure called for is reduced from 55" to 35", the pressure obtained is 41" to 25". Since the plane cannot maintain the elevation of 35,000 ft., when the actual intake pressure falls below 25", movement of the control lever to the 25" selecting position would cause the descent from 35,000 ft. to 25,000 ft. as represented by E—B. While thus descending the turbospeed would decrease because it would not be required to run as fast at 25,000 as at 35,000' in order to maintain the 25" called for. In order to maintain 35,000', the pilot must move the control lever to about 35" pressure selecting position to actually get 25". In doing so the engine speed is raised to 2200 R. P. M. so that Q (quantity of air flowing out of turbo blower) increases to keep Q/N in the stable range.

Therefore it is apparent that the aneroid by following the $o$—$p$—$q$ line effects such control of the turbospeed regulator that it is equivalent to reducing the pressure selection of the turbospeed regulator. The pressure called for can be obtained only so long as the maximum speed of the turbo is not exceeded. When the altitude is high (35,000' for example) the pressure obtained is less than the pressure selected by the pilot. Therefore he cannot maintain flight by moving the control lever to a position of minimum cruise. The lever can be moved only so far back toward idle position that the corresponding actual pressure is minimum cruise pressure. At this setting of the control lever, the engine speed is high enough to prevent Q/N surge.

In Fig. 20, E—D represents a gentle glide from 35,000' to 25,000'. The control lever is gradually moved from the 35 to the 25" pressure selecting position. As the altitude decreases the aneroid contracts and effects a control of the turbospeed regulator which is equivalent to raising the selection of blower outlet pressure (b.o.p.). At the same time, less and less b.o.p. is demanded as the control lever approaches the 25" position therefore the turbo blower speed decreases. The N of Q/N decreases. Also while the control lever is approaching the 25" position, the engine speed is decreasing, therefore Q of Q/N decreases. But Q/N remains in the range of stable operation of the turboblower during the glide from 35,000' to 25,000'.

In the lower range of pressure selections, surge is avoided by maintaining sufficiently high value of Q at high altitude and low pressure selection. When descending at a lower altitude with a low pressure selection, Q decreases about in the same proportion as N, and Q/N remains about the same.

In the higher range of pressure selections with higher engine speeds corresponding thereto, Q is large and N is limited by the maximum speed setting. Therefore Q/N is much greater than in the case of low pressure selections and is even further removed from the surge range.

Figure 23:
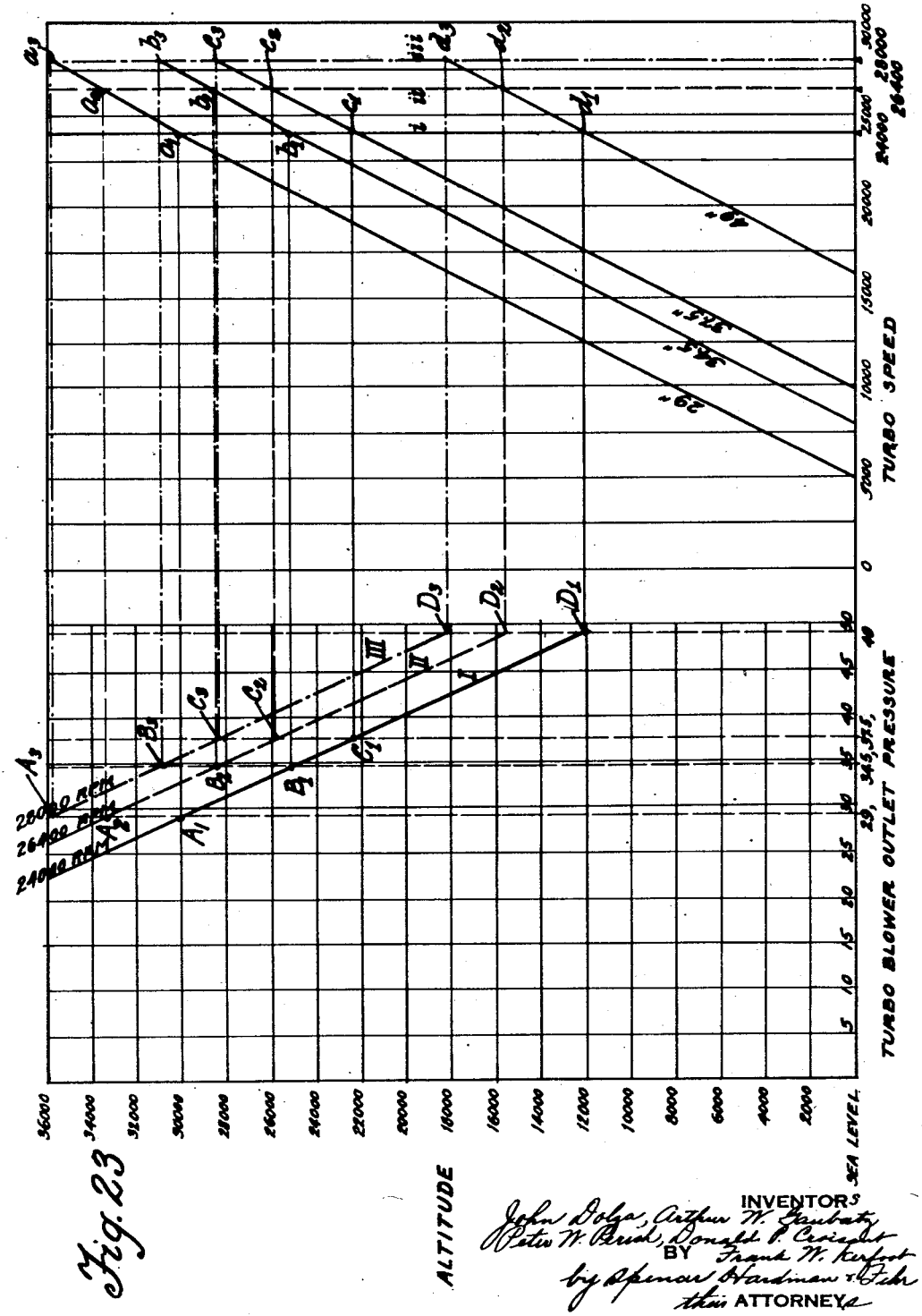

Fig. 23 shows the relations between turboblower outlet pressure (b.o.p.) and altitude and turbospeed. Line I is the 24,000 R. P. M. line for guaranteed maximum for continuous operation. Line II is the 26,400 R. P. M. line for 10% overspeed allowable for emergency. Line III is a 28,000 R. P. M. line which would be allowable for emergency if improved materials become available for strengthening the turbine. Points $A_1$, $A_2$, $A_3$ (which correspond respectively to points $a_1$, $a_2$, $a_3$ on the 29" pressure line) show the critical altitudes when the b.o.p. is 29" which corresponds to 45" manifold pressure (Fig. 18) which is in the cruising range. Points $B_1$, $B_2$, $B_3$ (corresponding to the points $b_1$, $b_2$, $b_3$ on the 34.5" pressure line) show the critical altitudes when the b.o.p. is 34.5" which corresponds to 55" manifold pressure (Fig. 18) which is military pressure. Points $C_1$, $C_2$, $C_3$ (corresponding to points $c_1$, $c_2$, $c_3$, on the 37.5" pressure line) show the critical altitudes when b.o.p. is 37.5" which corresponds to 61.15" manifold pressure (Fig. 18) which is in the emergency range and is the allowable maximum without water injection. Points $D_1$, $D_2$, $D_3$ (corresponding to points $d_1$, $d_2$, $d_3$ on the 49" pressure line) show the critical altitudes when b.o.p. is 49" which corresponds to 85" manifold pressure which is the allowable maximum with water injection.

Figure 24:
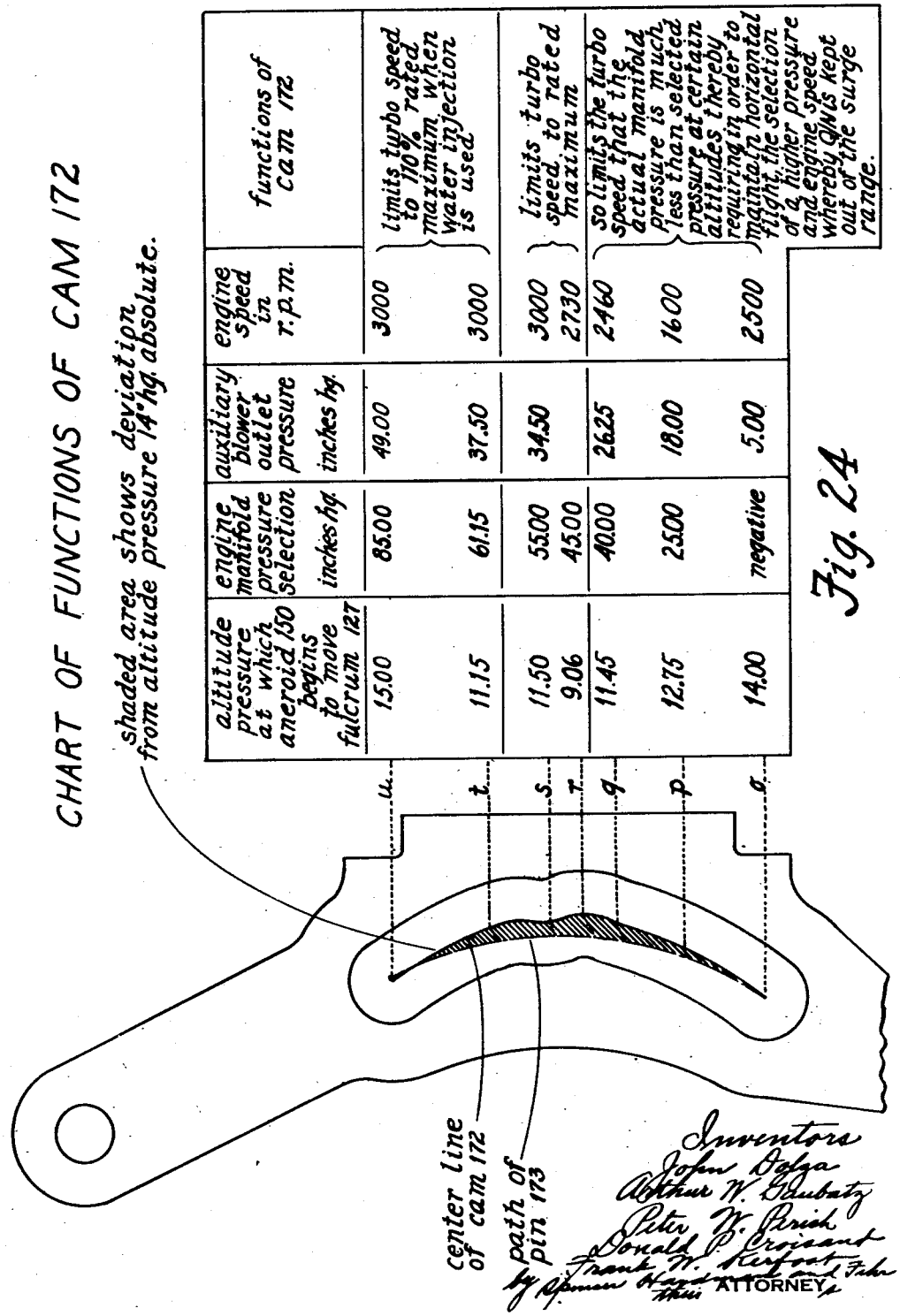

Fig. 24 gives a resumé of the functions of cam 172 which have been described in detail heretofore.

In order to obtain more accurate turbospeed control under all conditions including leaks in the duct leading from the turboblower to the carburetor it is advisable to make the controller 80 subject to control by turboblower outlet pressure rather than carburetor upper deck pressure. The reasons for this will be explained with reference to Fig. 21 in which the abscissa represents weight of air through the turboblower at constant engine speed and the ordinates of the upper part of the figure represent horse-power and the ordinates of the lower part represent turboblower outlet pressure.

If the waste gate is closed and all the air from the blower is fed to the engine and, in return, all the resultant exhaust goes through the turbine, the power that can be generated by the exhaust turbine is represented by line $A_2$—$B_2$. The power absorbed by the blower is represented by line $A_1$—$B_1$. The area (shaded by vertical lines) between these lines is power available for acceleration; and this power is wasted through the waste gate at fixed operating conditions.

When air leak in duct 27 is introduced, line $B_1$—$C_1$ denotes the increase of power absorbed by the turboblower. Line $B_4$—$C_4$ shows that the carburetor upper deck pressure has decreased, thereby indicating less air flowing to the engine and consequently less exhaust available to the turbine. $B_2$—$C_1$ denotes that the available power from the exhaust has been reduced as leakage increases from B to C until, at $C_1$, it is equal to the power required by the blower. The waste gate is consequently closed. $C_1$—$D_1$ denotes that the turbine speed decreases due to decrease in exhaust energy. $B_3$—$C_3$ denotes decrease of turboblower outlet pressure.

The turbo control is so designed that, when the pressure is reduced from the selected value, the waste gate closes until the selected pressure is restored; but, since the follow-up mechanism (link 141 (Fig. 8), lever 144, shaft 145 eccentrically supporting shaft 111) causes a droop or reduction in the pressure selected by cam 110 approximately equal to the difference between $B_3$ and $C_3$, the turbine speed will not increase because $B_3$ minus $C_3$ is the turboblower total outlet pressure change at fixed engine speed.

$C_4$ is not a fixed value but depends on the location of the leak. $C_4$ is lower when the leakage is next to the blower than when the leakage is next to the carburetor. However $B_4$ minus $C_4$ is considerably greater than $B_3$ minus $C_3$; therefore more droop in turboblower selected pressure would be required to prevent overspeeding of the turbine if the turbospeed control were subjected to control by carburetor upper deck pressure than when subject to control by turboblower outlet pressure. Therefore it is advanageous to connect the pipe 101 (Fig. 1) with the outlet of the turboblower.

The oil pressure line comprises inlet pipe 310 (Fig. 1), arrow 311 indicating pressure oil, pipe 314 connected with port 89 of controller 80, pipe 312 connected with pipes 313 and 269. Pipe 313 is connected with port 59 of regulator 50. The discharge of oil from the cylinder 51 of regulator 50 (Fig. 2) fills the bellows chamber 330 to the level of line 331 (Fig. 3) and overflows into passage 332 (Fig. 3) connected with drain not shown. When the regulator 50 is not operating, oil drains slowly from the bottom of chamber 330 into the pocket 333 (Fig. 2) and through a restricted passage 334 into the drain.

The discharge of oil from the cylinder 81 of controller 80 flows to the bellows chamber 340 (Figs. 11 and 17) either directly out of the valve guide 88 or through passages 88b and 88c. This discharge fills chamber 340 to about the level of rod 131 (Fig. 11) and it flows down into the housing 121 (Fig. 15) and out through a hole 342 covered by a plate 343 to which a drain pipe 344 is attached. When the controller 80 is not operating the oil in the bellows chamber 340 (Fig. 11) drains slowly through a restricted passage 341 into housing 121.

As shown diagrammatically in Fig. 1, pipe 70x connects intake manifold 35 with bellows 70. As shown in Fig. 3, pipe 70x is connected with passages 321, 322 and 323. As shown in Fig. 2, the left end of member 281 clears the rod 283 so that passage 323 is in connection with the interior of bellows 70.

While the embodiment of the present invention as herein disclosed, constitutes a preferred form, it is to be understood that other forms might be adopted, all coming within the scope of the claims which follow.

What is claimed is as follows:

1. Apparatus for controlling the intake pressure of an internal combustion engine supercharged by an engine driven blower and an auxiliary blower operated by an engine exhaust turbine comprising, in combination, a throttle valve for adjusting intake pressures, a turbine waste gate for adjusting turbine speed, a member for adjusting engine governed speed, a throttle valve regulator having a device for selecting an intake pressure to be maintained and a device responsive to intake pressure and a throttle valve operating servo motor under control by said devices of the throttle valve regulator for adjusting the throttle valve to correct for deviations of actual intake pressure from selected intake pressure, a waste gate regulator having a device for selecting an auxiliary blower outlet pressure to be maintained and a device responsive to auxiliary blower outlet pressure and a waste gate operating servo motor under control by said devices of the waste gate regulator for adjusting the waste gate to correct for deviations of actual auxiliary blower outlet pressure from the selected auxiliary outlet pressure, an altitude pressure responsive instrument for modifying the selected auxiliary blower outlet pressure in order to limit the turbine speed, a mechanism for determining at what altitude pressure said instrument shall become effective, and manually operable means for effecting, in coordination according to a predetermined schedule, an adjustment of the engine speed control member, an adjustment of the device for selecting an intake pressure, an adjustment of the device for selecting a blower outlet pressure and an adjustment of said mechanism.

2. Apparatus according to claim 1 further characterized by the fact that said mechanism includes a manually actuated cam which is adjusted in coordination with the selection of pressures in the cruising range so that the turbine speed is limited to values less than maximum rated value and, in coordination with the selection of pressures above the cruising range, so that the turbine speed attains the maximum rated value.

3. Apparatus according to claim 1 further characterized by the fact that said mechanism includes a manually actuated cam which is adjusted in coordination with the selection of pressures in the cruising range so that the turbine speed is limited to values less than maximum rated value and, in coordination with the selection of pressures for operation of the engine at normal maximum power, so that the turbine speed will be limited to a maximum rated value and, in coordination with the selection of pressures for emergency operation of the engine, so that the turbine speed will be limited to a certain value above maximum rated value.

4. Apparatus according to claim 1 further characterized by the provision of means normally operative to limit the control by said regulators to the attainment of intake pressures safe for engine operation without detonation, and fluid pressure responsive means for rendering said limiting means inoperative.

5. Apparatus according to claim 1 further characterized by the provision of means responsive to the operation of the second servo-motor to move the waste-gate toward closed position for effecting a reduction in auxiliary blower outlet pressure selection.

6. Apparatus for controlling the intake pressure of an internal combustion engine supercharged by an engine driven blower and an auxiliary blower operated by an engine exhaust turbine comprising, in combination, a throttle valve for adjusting intake pressure, a turbine waste gate for adjusting turbine speed, a member for adjusting engine governed speed, a throttle valve regulator having a rotary datum cam for selecting an intake pressure to be maintained and a bellows responsive to intake pressure and a throttle valve operating servomotor under control by said cam and bellows for adjusting the throttle valve to correct for deviations of actual intake pressure from selected intake pressure, a waste gate regulator having a rotary datum cam for selecting an auxiliary blower outlet pressure to be maintained and a bellows responsive to auxiliary blower outlet pressure and a waste gate operating servomotor under control by the cam and bellows of the waste gate regulator for adjusting the waste gate to correct for deviations of the actual auxiliary blower outlet pressure from the selected auxiliary blower outlet pressure, an altitude pressure responsive bellows for modifying the auxiliary blower outlet pressure selection in order to limit the turbine speed, a spring opposing expansion of the last named bellows; means for variably stressing said spring in order to determine at what altitude pressure said last named bellows shall become effective, and manually operable means for effecting, in coordination according to a predetermined schedule, an adjustment of the engine speed control member, adjustments of the datum cams of the regulators and an adjustment of said spring stressing means.

7. Apparatus according to claim 6 further characterized by the fact that the means for variably stressing the spring includes a spring abutment member and a manually actuated abutment member positioning cam having a contour such that, when said cam is adjusted in coordination with the selections of pressures in the cruising range, the turbine speed is limited to values less than maximum rated value and such that, when said cam is adjusted in coordination with the selection of pressures above the cruising range, the turbine speed attains the maximum rated value.

8. Apparatus according to claim 6 further characterized by the fact that the means for variably stressing the spring includes a spring abutment member and a manually actuated abutment member positioning cam having a contour such that, when said cam is adjusted in coordination with the selection of pressures in the cruising range, the turbine speed is limited to values less than maximum rated value and such that, when said cam is adjusted in coordination with the selection of pressures for operation of the engine at normal maximum power, the turbine speed will be limited to a maximum rated value and such that, when said cam is adjusted in coordination with the selection of pressures for emergency operation of the engine, the turbine speed will be limited to a certain value above maximum rated value.

9. Apparatus according to claim 6 further characterized by the provision of means for arresting movement of the cam followers of the datum cams of the regulators when the manually operable means is moved into positions for obtaining a certain high value range of pressure selections whereby the intake pressure is limited to a value safe for engine operation without detonation, and means for rendering inoperative said cam follower arresting means.

10. Apparatus according to claim 6 further characterized by the provision of means responsive to the operation of the second servo-motor to move the waste-gate toward closed position and for effecting such movement of the datum cam of the waste-gate regulator as to effect a reduction in auxiliary blower outlet pressure selection.

11. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower outlet pressure, means for selecting the blower outlet pressure to be maintained, and a manually operable means for adjusting both said pressure selecting means.

12. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower outlet pressure, means for selecting the blower outlet pressure to be maintained, a manually operable means for adjusting both said pressure selecting means, and means for modifying the auxiliary blower-outlet-pressure selection without changing the setting of said manually operable means.

13. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower-outlet-pressure, means for selecting the blower-outlet-pressure to be maintained, a manually operable means for adjusting both said pressure selecting means, and altitude pressure responsive means for modifying the auxiliary-blower-outlet-pressure selection without changing the setting of said manually operable means.

14. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower-outlet-pressure, means for selecting the blower-outlet-pressure to be maintained, manually operable means for adjusting both said pressure selecting means, altitude pressure responsive means for modifying the auxiliary-blower-outlet-pressure selection without changing the setting of said manually operable means, and manually operable means coordinated with the manual adjustment of both said pressure selecting means for varying the altitude-pressure at which the blower - outlet - pressure - selection - modifying means becomes effective.

15. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower-outlet-pressure to be maintained, manually operable means for adjusting both said pressure selecting means, and means actuated in response to operation of the auxiliary-blower-speed controller to increase speed for decreasing the auxiliary-blower-outlet-pressure selection.

16. In combination with an internal combustion engine having a variable speed supercharger, means for maintaining selected pressures in the engine intake pipe and means for selecting a particular pressure to be maintained, means for controlling the speed of the supercharger comprising a speed controlling element, a servo-motor for operating said element, a member for controlling the operation of the servo-motor, mechanism for operating said member including a bellows responsive to the supercharger outlet pressure and a cam for selecting said outlet pressure and means for concurrently operating said cam and the means for selecting the engine intake pressure.

17. For use with a variable speed blower for an internal combustion engine, a blower speed controller comprising a servo-motor for operating a speed varying element, a member for controlling the servo-motor, and apparatus for effecting a joint control of said member and including a manually positioned blower-outlet-pressure-selecting cam, a bellows responsive to blower-outlet-pressure, and means responsive to operation of the servo-motor for shifting the cam.

18. In combination with an internal combustion engine having a variable speed supercharger, means for maintaining selected pressures in the engine intake pipe and means for selecting a particular pressure to be maintained, means for controlling the speed of the supercharger comprising a speed controlling element, a servo-motor for operating said element, a member for controlling the operation of the servo-motor, mechanism for operating said member including a bellows responsive to the supercharger outlet pressure, a cam for selecting said outlet pressure and means for concurrently operating said cam and the means for selecting the engine intake pressure and a bellows responsive to altitude pressure for also controlling the action of the member which regulates the action of the servo-motor.

19. For use with a variable speed blower for an internal combustion engine, a blower speed controller comprising a servo-motor for operating a speed varying element, a member for controlling the servo-motor, and apparatus for effecting a joint control of said member and including a manually positioned blower-outlet-pressure-selecting cam, a bellows responsive to blower-outlet-pressure, and a bellows responsive to altitude pressure, and manually operated means coordinated with the manual positioning of the cam for determining the altitude pressure at which the last named bellows becomes effective to control said member.

20. For use with a variable speed blower for an internal combustion engine, a blower speed controller comprising a servo-motor for operating a speed varying element, a member for controlling the servo-motor, and apparatus for effecting a joint control of said member and including a manually positioned blower outlet pressure selecting cam, a bellows responsive to blower outlet pressure, means responsive to operation of the servo-motor for shifting the cam, a bellows responsive to altitude pressure, and manually operated means coordinated with the manual positioning of the cam for determining the altitude pressure at which the last named bellows becomes effective to control said member.

21. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower outlet pressure, means for selecting the blower outlet pressure to be maintained, manually operable means for adjusting both said pressure selecting means, devices normally operative to limit the intake pressure and the auxiliary blower outlet pressure to values less than the maximum obtainable values and means for rendering the limiting devices inoperative.

22. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower-outlet-pressure, means for selecting the blower-outlet-pressure to be maintained, manually operable means for adjusting both said pressure selecting means, means for modifying the auxiliary-blower-outlet-pressure selection without changing the setting of said manually operable means, devices normally operative to limit the intake pressure and the auxiliary blower-outlet-pressure to values less than the maximum obtainable values and for limiting the action of the modifying means, and means for rendering the limiting devices inoperative.

23. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower-outlet-pressure, means for selecting the blower-outlet-pressure to be maintained, manually operable means for adjusting both said pressure selecting means, altitude pressure responsive means for modifying the auxiliary-blower-outlet-pressure selection without changing the setting of said manually operable means, devices normally operative to limit the intake pressure and the auxiliary-blower-outlet-pressure to values less than the maximum obtainable values and for limiting the action of the modifying means and means for rendering the limiting devices inoperative.

24. In apparatus for controlling the intake pressure of an internal combustion engine supercharged by a main blower and by a variable speed auxiliary blower and having a throttle valve for controlling the intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower-outlet-pressure, means for selecting the blower-outlet-pressure to be maintained, manually operable means for adjusting both said pressure selecting means, altitude pressure responsive means for modifying the auxiliary-blower-outlet-pressure selection without changing the setting of said manually operable means, manually operable means coordinated with the manual adjustment of both said pressure selecting means for varying the altitude pressure at which the blower-outlet-pressure-selection modifying means becomes effective, devices normally operative to limit the intake pressure and the auxiliary blower-outlet-pressure to values less than the maximum obtainable values and for limiting the action of the modifying means and means for rendering the limiting devices inoperative.

25. In apparatus for controlling the intake pressure of an internal combustion engine supercharged by a main blower and by a variable speed auxiliary blower and having a throttle valve for controlling intake pressure, the combination comprising a regulator for positioning the throttle valve so as to maintain a selected intake pressure, means for selecting the intake pressure to be maintained, an auxiliary blower speed controller for causing the auxiliary blower to operate at a speed that will produce a selected blower-outlet-pressure, means for selecting the blower-outlet-pressure to be maintained, manually operable means for adjusting both said pressure selecting means, means responsive to an altitude pressure determined by manual control coordinated with pressure selections for effecting a limitation of auxiliary blower speed to a certain value for pressure selections in an intermediate range and to a certain high value of speed for pressure selections in the high range, devices normally operative to limit the intake pressure and the auxiliary blower-outlet-pressure to values within the intermediate range and the blower speed to the lower value, and means for rendering the limiting devices inoperative.

26. For use with a variable speed blower for an internal combustion engine, a blower speed controller comprising a servo-motor for operating a speed varying element, and apparatus for effecting a joint control of said motor and including a blower-outlet-pressure-selecting cam, a bellows responsive to blower-outlet-pressure, a cam follower connected with the bellows, a manually operated member for moving the cam, a device normally operative for so limiting the movement of the cam that it cannot follow the member into certain pressure-selecting positions, and means for rendering said limiting device inoperative.

27. For use with a variable speed blower for an internal combustion engine, a blower speed controller comprising a servomotor for operating a speed varying element, and apparatus for effecting a joint control of said motor and including a blower outlet pressure selecting cam, a bellows responsive to blower outlet pressure, a cam follower connected with the bellows, means responsive to operation of the servomotor for shifting the cam, a manually operated member for moving the cam, a device normally operative for so limiting the movement of the cam that it cannot follow the member into certain pressure selecting positions and means for rendering said limiting device inoperative.

28. For use with a variable speed blower for an internal combustion engine, a blower speed controller comprising a servomotor for operating a speed varying element, and apparatus for effecting a joint control of said motor and including a blower outlet pressure selecting cam, a bellows responsive to blower outlet pressure, a cam follower connected with the bellows, a bellows responsive to altitude pressure connected with the cam follower, a manually operated member for moving the cam, a device normally operative for so limiting the movement of the cam that it cannot follow the member into certain pressure selecting positions, a device normally operative to limit control by the bellows responsive to altitude pressure, and means for rendering said limiting devices inoperative.

29. For use with a variable speed blower for an internal combustion engine, a blower speed controller comprising a servomotor for operating a speed varying element, an apparatus for effecting a joint control of said motor and including a blower outlet pressure selecting cam, a bellows responsive to blower outlet pressure, a cam follower connected with the bellows, a bellows responsive to altitude pressure connected with the cam follower, and manually operated means coordinated with the manual positioning of the cam for determining the altitude pressure at which the last named bellows becomes effective to control said cam follower, a manually operated member for moving the cam, a device normally operative for so limiting the movement of the cam that it cannot follow the member into certain pressure selecting positions, a device normally operative to limit control by the bellows responsive to altitude pressure, and means for rendering said limiting device inoperative.

30. For use with a variable speed blower for an internal combustion engine, a blower speed controller comprising a servomotor for operating a speed varying element, an apparatus for effecting a joint control of said motor and including a blower outlet pressure selecting cam, a bellows responsive to blower outlet pressure, a cam follower connected with the bellows, means responsive to operation of the servomotor for shifting the cam, a bellows responsive to altitude pressure connected with the follower, and manually operated means coordinated with the manual positioning of the cam for determining the altitude pressure at which the last named bellows becomes effective to control said cam follower, a manually operated member for moving the cam, a device normally operative for so limiting the movement of the cam that it cannot follow the member into certain pressure selecting positions, a device normally operative to limit control by the bellows responsive to altitude pressure, and means for rendering said limiting device inoperative.

31. For use with a variable speed blower for an internal combustion engine, a blower speed controller comprising a servomotor for operating a speed varying element, a part for controlling the servomotor, an apparatus for effecting a joint control of said part and including a manually positioned blower outlet pressure selecting cam, a bellows responsive to blower outlet pressure, a lever connected with the bellows and with the part, and a cam follower engageable with the cam and connected with the lever.

32. For use with a variable speed blower for an internal combustion engine, a blower speed controller comprising a servomotor for operating a speed varying element, a part for controlling the servomotor, an apparatus for effecting a joint control of said part and including a manually positioned blower outlet pressure selecting cam, a bellows responsive to blower outlet pressure, a lever connected with the bellows and with the part, and a cam follower engageable with the cam and connected with the lever, and means responsive to operation of the servomotor for shifting the cam.

33. For use with a variable speed blower for an internal combustion engine, a blower speed controller comprising a servomotor for operating a speed varying element, a part for controlling the servomotor, and apparatus for effecting a joint control of said part and including a manually positioned blower outlet pressure selecting cam, a bellows responsive to blower outlet pressure, a lever connected with the bellows and with the part, a second lever engageable with the cam and connected with the first lever, and a bellows responsive to altitude pressure for variably positioning the second lever.

34. For use with a variable speed blower for an internal combustion engine, a blower speed controller comprising a servomotor for operating a speed varying element, a part for controlling the servomotor, and apparatus for effecting a joint control of said part and including a manually positioned blower outlet pressure selecting cam, a bellows responsive to blower outlet pressure, a lever connected with the bellows and with the part, a second lever engageable with the cam and connected with the first lever, a bellows responsive to altitude pressure for variably positioning the second lever, and manually operated means coordinated with the manual positioning of the cam for determining the altitude pressure at which the second bellows becomes effective to control the second lever.

35. For use with a variable speed blower for an internal combustion engine, a blower speed controller comprising a servomotor for operating a speed varying element, a part for controlling the servomotor, and apparatus for effecting a joint control of said part and including a manually positioned blower outlet pressure selecting cam, a bellows responsive to blower outlet pressure, a lever connected with the bellows and with the part, a second lever engageable with the cam and onnected with the first lever, a bellows responsive to altitude pressure, a spring resisting expansion of said bellows, a part pivotally supporting the second lever and actuated by the second bellows, and manually operated means coordinated with the manual positioning of the cam for controlling the bellows resisting force of said spring.

36. For use with a variable speed blower for an internal combustion engine, a blower speed controller comprising a servomotor for operating a speed varying element, a part for controlling the servomotor, and apparatus for effecting a joint control of said part and including a blower outlet pressure selecting cam, a bellows responsive to blower outlet pressure, a lever connected with the bellows and with the part, a cam follower engageable with the cam and connected with the lever, a manually operated member for moving the cam, a stop member normally positioned for limiting movement of the cam in following the member into certain positions of pressure selection, and means for retracting the stop.

37. For use with a variable speed blower for an internal combustion engine, a blower speed controller comprising a servomotor for operating a speed varying element, a part for controlling the servomotor, and apparatus for effecting a joint control of said part and including a blower outlet pressure selecting cam, a bellows responsive to blower outlet pressure, a lever connected with the bellows and with the part, a cam follower engageable with the cam and connected with the lever, an altitude pressure responsive bellows connected with the cam follower, a manually operated member for moving the cam, a stop member normally positioned for limiting movement of the cam in following the member into certain positions of pressure selection, a stop member for limiting movement of the cam follower by the second bellows, and means for retracting the stops.

38. For use with a variable speed blower for an internal combustion engine, a blower speed controller comprising a servomotor for operating a speed varying element, a part for controlling the servomotor, and apparatus for effecting a joint control of said part and including a blower outlet pressure selecting cam, a bellows responsive to blower outlet pressure, a lever connected with the bellows and with the part, a cam follower lever engageable with the cam and connected with the first lever, a bellows responsive to altitude pressure, a spring resisting expansion of said bellows, a part pivotally supporting the cam follower and actuated by the second bellows, a manually operated member for moving the cam, manually operated means coordinated with the manual positioning of the cam for controlling the bellows resisting force of said spring, a stop member normally positioned for limiting the movement of the cam in following the member into certain positions of pressure selection, a stop member for limiting the control of the bellows resisting spring, and operated means for retracting the stops.

39. For use with a variable speed blower for an internal combustion engine, a blower speed controller comprising a servomotor for operating a speed varying element, a part for controlling the servomotor, and apparatus for effecting a joint control of said part and including a manually positioned blower outlet pressure selecting cam, a bellows responsive to blower outlet pressure, a cam follower lever having one end engageable with the cam and the other end connected with said bellows, a floating fulcrum pivotally supporting an intermediate portion of the lever, a bellows responsive to altitude pressure for actuating the fulcrum, a spring resisting expansion of the second bellows, a spring abutment element, and manually operated means coordinated with the manual positioning of the cam for variably positioning the abutment element.

40. For use with a variable speed blower for an internal combustion engine, a blower speed controller comprising a servomotor for operating a speed varying element, a part for controlling the servomotor, and apparatus for effecting a joint control of said part and including a blower outlet pressure selecting cam, a bellows responsive to blower outlet pressure, a cam follower lever having one end engageable with the cam and the other end connected with said bellows, a floating fulcrum pivotally supporting an intermediate portion of the lever, a bellows responsive to altitude pressure for actuating the fulcrum, a spring resisting expansion of the second bellows, a spring abutment element, a manually operated member for moving the cam, manually operated means coordinated with the manual positioning of the cam for variably positioning the abutment element, a stop normally operative to limit movement of the cam in following the member into certain positions of pressure selection, a stop normally operative to limit movement of the spring abutment element in a direction which decreases spring resistance to expansion of the second bellows, and means for retracting the stops.

JOHN DOLZA.
ARTHUR W. GAUBATZ.
PETER W. PERISH.
DONALD P. CROISANT.
FRANK W. KERFOOT.

REFERENCES CITED

The following references are of record in the file of this patent:

UNITED STATES PATENTS

| Number | Name | Date |
|---|---|---|
| 1,816,787 | Moss | July 28, 1931 |
| 2,187,737 | Gregory | Jan. 23, 1940 |
| 2,217,364 | Halford et al. | Oct. 8, 1940 |
| 2,228,239 | Ammann | Jan. 14, 1941 |
| 2,283,175 | Berger | May 19, 1942 |
| 2,285,344 | Marples et al. | June 2, 1942 |
| 2,297,235 | Müller | Sept. 29, 1942 |
| 2,305,810 | Müller | Dec. 22, 1942 |
| 2,355,759 | Stokes | Aug. 15, 1944 |
| 2,359,615 | Browne et al. | Oct. 3, 1944 |
| 2,376,143 | Edwards et al. | May 15, 1945 |
| 2,376,199 | Shoults | May 15, 1945 |
| 2,428,531 | Schorn | Oct. 7, 1947 |

OTHER REFERENCES

Ser. No. 281,826, Stieglitz (A. P. C.), published May 18, 1943.